US011151208B2

(12) United States Patent
Miller et al.

(10) Patent No.: US 11,151,208 B2
(45) Date of Patent: Oct. 19, 2021

(54) SYSTEM AND METHOD FOR RECOMMENDING USERS BASED ON SHARED DIGITAL EXPERIENCES

(71) Applicant: Match Group, LLC, Dallas, TX (US)

(72) Inventors: Kyle Miller, Hermosa Beach, CA (US); Lawrence A. Sequino, Los Angeles, CA (US); Joshua D. Gafni, West Hollywood, CA (US)

(73) Assignee: MATCH GROUP, LLC, Dallas, TX (US)

( * ) Notice: Subject to any disclaimer, the term of this patent is extended or adjusted under 35 U.S.C. 154(b) by 175 days.

(21) Appl. No.: 16/529,932

(22) Filed: Aug. 2, 2019

(65) Prior Publication Data

US 2021/0034685 A1 Feb. 4, 2021

(51) Int. Cl.
G06F 7/02 (2006.01)
G06F 16/00 (2019.01)
G06F 16/9535 (2019.01)
G06F 16/435 (2019.01)
G06F 16/9538 (2019.01)

(52) U.S. Cl.
CPC ........ *G06F 16/9535* (2019.01); *G06F 16/437* (2019.01); *G06F 16/9538* (2019.01)

(58) Field of Classification Search
CPC ............... G06F 16/9535; G06F 16/437; G06F 16/9538; G06F 16/3334; G06F 16/3337; G06N 20/00
See application file for complete search history.

(56) References Cited

U.S. PATENT DOCUMENTS

| 9,733,811 | B2 | 8/2017 | Rad et al. | |
|---|---|---|---|---|
| 2007/0031800 | A1 | 2/2007 | Solomon | |
| 2007/0072468 | A1* | 3/2007 | Terrill | G06F 16/9535 439/260 |
| 2011/0125783 | A1* | 5/2011 | Whale | G06F 16/93 707/769 |
| 2012/0271884 | A1 | 10/2012 | Holmes et al. | |
| 2014/0214592 | A1 | 7/2014 | He et al. | |
| 2015/0006537 | A1* | 1/2015 | Jenkins | G06F 16/358 707/740 |

(Continued)

OTHER PUBLICATIONS

PCT Notification of Transmittal of the International Search Report and the Written Opinion of the International Searching Authority, or the Declaration; Appln No. PCT/US2020/042840; 13 pages, dated Oct. 27, 2020.

*Primary Examiner* — Bruce M Moser
(74) *Attorney, Agent, or Firm* — Baker Botts, LLP

(57) ABSTRACT

An apparatus includes an interface and a processor. The interface sends and receives data over a network. The processor uses the interface to transmit a first media file to a device of a user. The first media file presents a first choice between at least two options. The processor uses the interface to receive from the user a first selection in response to the first choice. In response to receiving the first selection, the processor transmits a second media file to the device. The second media file presents a second choice between at least two options. The processor uses the interface to receive from the user a second selection in response to the second choice. The processor identifies, based in part on the first selection and the second selection, a second user as potentially compatible with the user and transmits to the user a profile of the second user.

16 Claims, 8 Drawing Sheets

(56) References Cited

U.S. PATENT DOCUMENTS

| | | |
|---|---|---|
| 2015/0019581 A1 | 1/2015 | Svendsen et al. |
| 2016/0196336 A1* | 7/2016 | Allen .................. G06F 16/9535 707/734 |
| 2019/0005398 A1 | 1/2019 | Zheng |

* cited by examiner

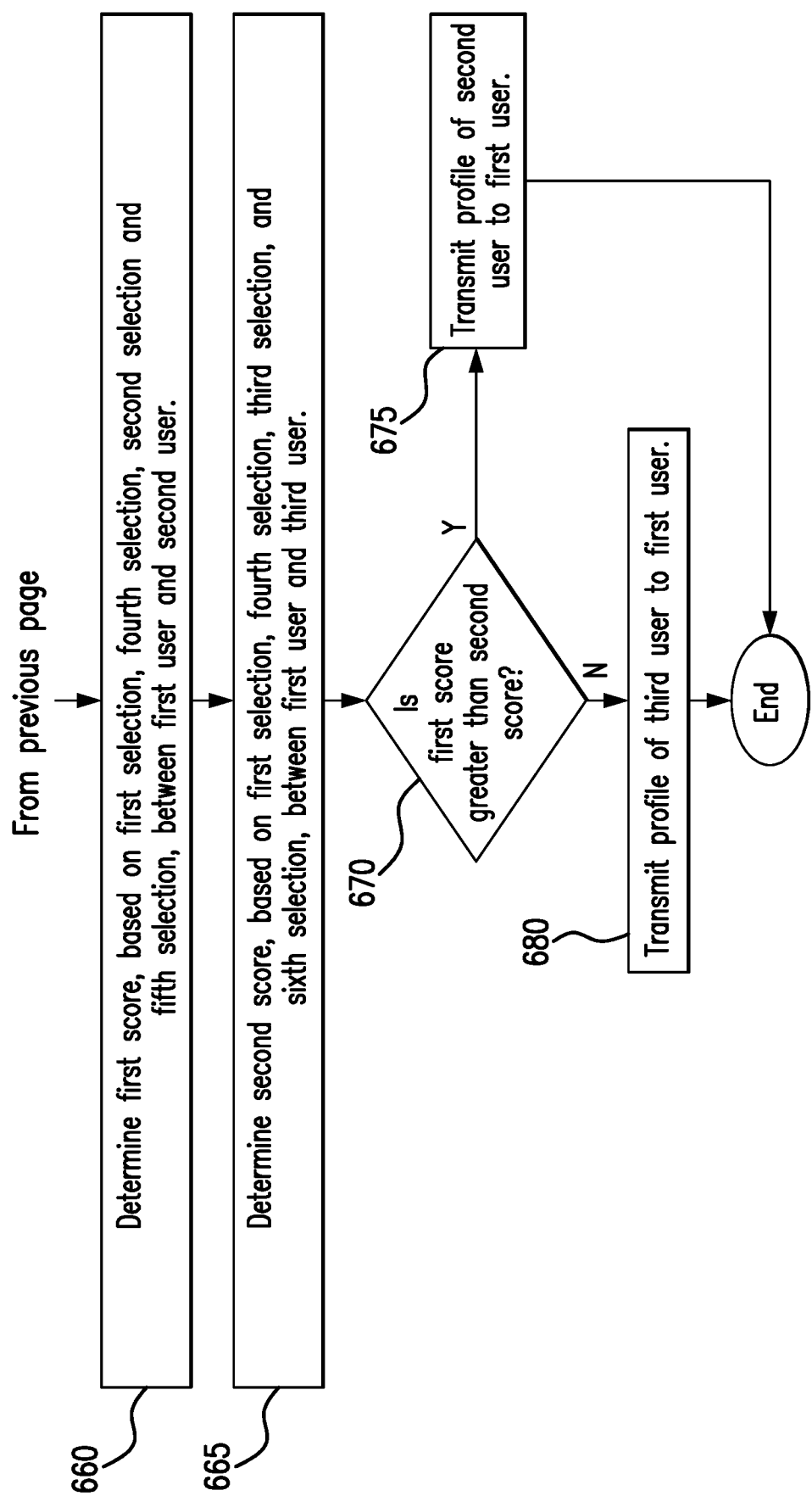

SYSTEM AND METHOD FOR RECOMMENDING USERS BASED ON SHARED DIGITAL EXPERIENCES

TECHNICAL FIELD

This invention relates generally to the field of communications and, more particularly, to a system and method for recommending users based on shared digital experiences.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction. For example, certain network protocols may be used to allow an end user to connect online with other users who satisfy certain search requirements. These protocols may relate to job searches, person finding services, real estate searches, or online dating.

SUMMARY

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction. For example, certain network protocols may be used to allow an end user to connect online with other users who satisfy certain search requirements. These protocols may relate to job searches, person finding services, real estate searches, or online dating.

In a typical online matching/recommendation system, profiles that include particular sets of attributes related to participants in the system may be used to facilitate matching. For example, in the online dating context, the profiles might include attributes such as age, education, and interests. A typical online matching/recommendation system might provide algorithmic estimates of compatibility scores between pairs of participants by comparing various attributes from each participant's profile. However, such systems typically rely on detailed personal information, which many prospective participants may be reluctant to provide to the system. Accordingly, at least some prospective participants might choose to provide false profile information, while others might simply elect not to participate in the online matching/recommendation system. In either instance, the prospective participant may either receive poor compatibility results (based at least in part on the false profile information) or fail to receive any results at all (based on a failure to participate). Additionally, many users may provide profile information to the system that represents an idealized version of themselves that is far from an accurate representation. Accordingly, those participants who are matched with such users may face disappointment when interacting with these users in real life.

Another potential problem in the online matching/recommendation arena is inactivity by end users in their respective online communities. When end users are not being active in reviewing information that they are sent, they can inhibit their own online experiences. Participation is a significant contributor to online customer satisfaction. Thus, the ability to encourage these end users to be involved in a given service, which is fostered by their own contributions, offers a significant challenge to website/application operators, component manufacturers, service providers, and system designers alike.

This disclosure contemplates a digital experience-based recommendation tool that addresses one or more of the above issues. The digital experience-based recommendation tool takes into account a user's choices made while participating in a digital event in order to provide the user with better recommendations of other users that may be compatible with him/her. During the event, users navigate through a non-linear branching story transmitted to their devices. Each branch of the non-linear branching story may consist of a display (e.g., video) that presents a set of options to a user. The options may be designed to probe certain aspects of the user's personality. For example, a video presenting a user with the option of going sky diving or taking a walk may be probative of the adventurousness of the user. In certain embodiments, the tool prompts the user to select an option within a brief window of time, encouraging the user to act on his/her instincts, potentially increasing the likelihood that the user's choice accurately reflects his/her personality. The tool records the choice selected by the user and transmits additional media to the user based on this choice. This process repeats as the user navigates through the story. The tool uses the choices made by a user during the event to provide the user with recommendations of other users who may be compatible with him/her based on shared choices made by the users throughout the event. In this manner, certain embodiments of the tool may connect those users with similar personality traits to one another who participated in the event, where the compatibility between the users is determined in part based on their shared experiences during the event. Certain embodiments of the digital experience-based recommendation tool are described below.

According to an embodiment, a method includes transmitting a first media file to a device of a first user. The first media file presents a first choice between at least two options. The method also includes receiving from the first user a first selection in response to the first choice. In response to receiving the first selection from the first user, the method includes transmitting a second media file to the device of the first user. The second media file presents a second choice between at least two options. The method further includes receiving from the first user a second selection in response to the second choice. The method additionally includes identifying, based in part on the first selection and the second selection, a second user as potentially compatible with the first user. The method also includes transmitting to the first user a profile of the second user.

According to another embodiment, an apparatus includes an interface and a hardware processor. The interface sends and receives data over a network. The hardware processor uses the interface to transmit a first media file to a device of a first user. The first media file presents a first choice between at least two options. The processor further uses the interface to receive from the first user a first selection in response to the first choice. In response to receiving the first selection from the first user, the processor uses the interface to transmit a second media file to the device of the first user. The second media file presents a second choice between at least two options. The processor additionally uses the interface to receive from the first user a second selection in response to the second choice. The processor additionally identifies, based in part on the first selection and the second selection, a second user as potentially compatible with the first user. The processor also uses the interface to transmit to the first user a profile of the second user.

According to a further embodiment, a system includes a communication element, a storage element, and a processing element. The communication element is operable to send and receive data over a network. The storage element operable to store a set of media files, a set of profiles, and a set of weights. The set of media files includes a first media file and a second media file. The first media file is configured to present a first choice between at least two options. The second media file is configured to present a second choice between at least two options. The set of profiles includes a profile of a first user and a profile of a second user. The set of weights includes a first weight and a second weight. The first weight is assigned to the first choice, the second weight is assigned to the second choice. The processing element is operable to use the communication element to transmit the first media file to a device of the first user. The processing element is also operable to use the communication element to receive from the first user, within a threshold period of time, a first selection in response to the first choice. In response to receiving the first selection from the first user, the processing element is operable to use the communication element to transmit the second media file to the device of the first user. The processing element is further operable to use the communication element to receive from the first user, within the threshold period of time, a second selection in response to the second choice. The processing element is also operable to identify, based in part on the first selection, the second selection, the first weight, the second weight, the profile of the first user, and the profile of the second user, the second user as potentially compatible with the first user. The processing element is additionally operable to use the communication element to transmit to the first user the profile of the second user. The processing element is further operable to add information to the profile of the first user, where the information based in part on the first selection and the second selection.

Certain embodiments provide one or more technical advantages. For example, an embodiment provides enhanced recommendations based on user personality traits revealed through a shared digital experience. As another example, an embodiment connects geographically separated individuals with similar personality traits. As an additional example, an embodiment enables users to participate in a shared experience without traveling to a physical location. As another example, an embodiment generates profile information for a user based on the choices made by the user during the event, rather than relying on the user to manually enter profile information. As another example, an embodiment may present recommendations of potentially compatible users to one another, where potential compatibility is assessed based on choices made by the users while participating in a digital event, rather than on personal information entered by the users into their user profiles. As a further example, an embodiment connects users who are active on the network during the event, increasing the likelihood of contact between those users recommended to one another. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 7 of the drawings, like numerals being used for like and corresponding parts of the various drawings.

Figure 1:
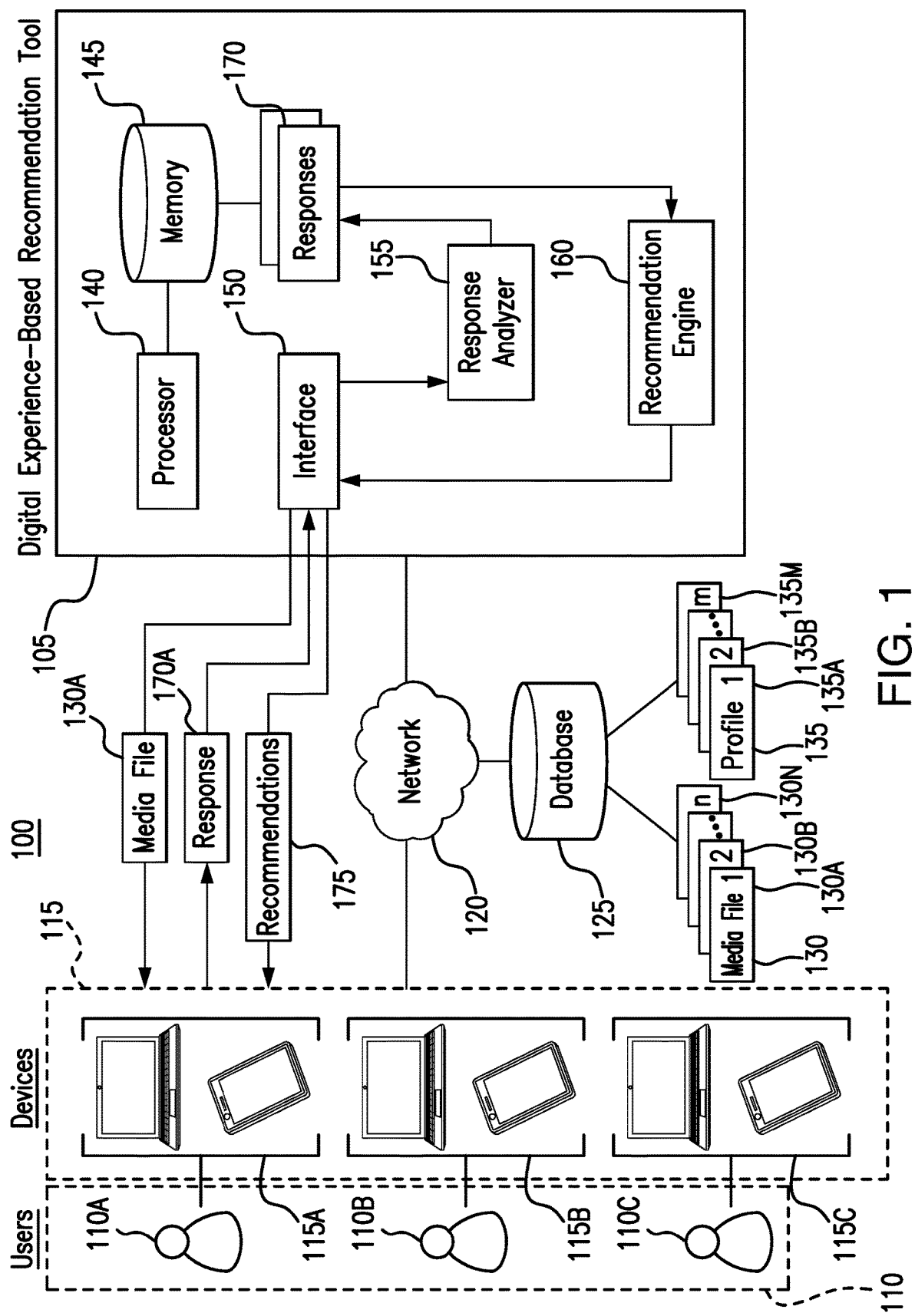
FIG. 1 illustrates an example system.

FIG. 1 illustrates an example system 100. As seen in FIG. 1, system 100 includes digital experience-based recommendation tool 105, one or more devices 115, network 120, and database 125. Generally, digital experience-based recommendation tool 105 transmits media files 130 to devices 115, receives responses 170A from devices 115, and generates recommendations 175 based on responses 170. This disclosure contemplates that media files 130 may include any type of media. For example, media files 130 may include pre-recorded videos, live-streamed video, images, text, audio, virtual or augmented reality simulations, or any other appropriate form of media. The media files 130 that tool 105 sends to a given device 115 depend on responses 170 that tool 105 receives from device 115. For example, digital experience-based recommendation tool 105 may transmit first media file 130A to both first device 115A belonging to first user 110A and to second device 115B belonging to second user 110B. First media file 130A may present two or more options to first user 110A and second user 110B. For example, first media file 130A may ask the user to choose between a first option, such as attending a concert, and a second option, such as attending a house party. Users 110A and 110B each select an option using their devices 115A and 115B and transmit these selected options back to digital experience-based recommendation tool 105 as responses 170. For example, first user 110A may select the first option (e.g., concert), while second user 110B may select the second option (e.g., house party). In response to receiving the first option from first user 110A, digital experience-based recommendation tool 105 may transmit second media file 130B to first device 115A, while digital experience-based recommendation tool 105 may transmit third media file 130C to second device 115B, third media file 130C different from second media file 130B, in response to receiving the second option from second user 110B. For example, if the first option corresponds to attending a concert, second media file 130B may display video of attendees walking into the concert venue and present first user 110A with a choice between joining a first line or a second line. Similarly, if the second option corresponds to attending a house party, third media file 130C may display video of the user approaching the front door of the house and present second user 110B with a choice between ringing the doorbell or opening the door and heading right in. In this manner, digital experience-based recommendation tool 105 enables users 110A through 110C to navigate through a non-linear branching story, where the path a given user 110 takes through the story depends on the responses 170 to the options presented by media files 165 that user 110 provides to the tool.

Digital experience-based recommendation tool 105 receives a series of responses 170 from each participating user 110A through 110C. At one or more times during the story, digital experience-based recommendation tool 105 may compare these sets of responses 170 to determine potential compatibility among users. For example, digital experience-based recommendation tool 105 may compare responses 170A provided by first user 110A to responses 170B provided by second user 110B and responses 170C provided by third user 110C, to determine that second user 110B may be more compatible to first user 110A than third user 110C and, accordingly, may be a potential match to first user 110A and not to third user 110C. In response to determining that second user 110B may be a potential match to first user 110A, digital experience-based recommendation tool 105 may transmit profile 135B assigned to second user 110B to first user 110A, as recommendation 175.

This disclosure contemplates that digital experience-based recommendation tool 105 may compare the set of responses 170 provided by each user at any time during the story. For example, in certain embodiments, digital experience-based recommendation tool 105 may compare the set of responses 170 provided by user 110A to the set of responses 170 provided by other users 110 after user 110A has reached the end of the story.

This disclosure contemplates that recommendations 175 may be based solely on responses 170 provided by users 110A through 110C. Alternatively, this disclosure also contemplates that responses 170 may be used as a factor of a set of factors considered in a larger recommendation algorithm. For example, in certain embodiments, users 110A through 110C may submit information about themselves as well as preferred characteristics of other users with whom they are seeking to be matched using tool 105. Such information may include gender, preferred gender of a potential match, height, weight, age, location, ethnicity, birthplace, eating habits, activities, and goals. Additionally, users 110A through 110C may provide tool 105 with information indicating how important certain factors are when looking for a match. For example, users 110A through 110C may indicate which characteristics in a potential match are a necessity. As another example, tool 105 may ask users 110 to indicate, "How important is it that your match does not smoke?" Tool 105 may also allow users 110 to indicate that certain characteristics are not important search criteria. For example, user 110A may indicate to tool 105 that the weight and/or height of a potential match is not important. In certain embodiments, tool 105 may prompt users 110A through 110C to provide information to the tool. For example, tool 105 may require users 110 to answer a number of questions or provide a number of descriptions, prior to enabling the users to participate in the recommendation system. Tool 105 may be configured to receive the information submitted by users 110A through 110C and to create profiles 135A through 135C for users 110A through 110C based on that information. In addition to using information provided by a user 110A to create profile 135A, digital experience-based recommendation tool 105 may also use responses 170 to add additional information to the user's profile. For example, tool 105 may use responses 170 to determine that a user 110A is more likely to choose an adventurous option when presented with a choice between the adventurous option and a cautious/unadventurous option. Accordingly, tool 105 may add an adventurous attribute to the user's profile. This disclosure contemplates that such attributes may be binary (i.e., simply indicating that the user has the attribute), or may be associated with a score indicating the degree to which the attribute may be present in the user's personality. For example, a user 110A may be highly adventurous, moderately adventurous, or somewhat adventurous. This disclosure contemplates that digital experience-based recommendation tool may add any number of attributes to a user's profile 135A based on responses 170 provided by user 110A while participating in a digital event.

In certain embodiments, digital experience-based recommendation tool 105 may be configured to search through information contained in profiles 135 (including attributes obtained from responses 170) to determine recommendations 175. Techniques for determining relevant recommendations for users may include determining how closely one user's preferences match another user's characteristics/attributes and vice versa. In some embodiments, tool 105 may be configured to generate a pool of recommendations 175 for user 110A according to various characteristics/attributes and preferences of user 110A and of other users of the system. Tool 105 may assign scores to the pool of recommendations for user 110A based on preferences and/or activity of user 110A. Tool 105 may also restrict entities from being included in the pool of recommendations based on the status of the profile, location information regarding the entity, or location information regarding user 110A. In this manner, certain embodiments of tool 105 may provide a recommendation 175 of user 110B to user 110A based on both the shared experiences of users 110A and 110B while participating in a digital event, as well as information provided by users 110A and 110B when setting up profiles 135A and 135B.

Devices 115 are used by users 110 to receive and display media files 130 from digital experience-based recommendation tool 105 and to send response 170 back to digital experience-based recommendation tool 105. In certain embodiments, devices 115 may communicate with digital experience-based recommendation tool 105 through network 120 via a web interface.

Devices 115 include any appropriate device for communicating with components of system 100 over network 120. For example, device 115 may be or may be accompanied by a telephone, a mobile phone, a computer, a laptop, a tablet, a server, an automated assistant, and/or a virtual reality or augmented reality headset or sensor, or other device. This disclosure contemplates device 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 stores media 130 and a set of user profiles 135. Media 130 contains media comprising the non-linear branching story transmitted by digital experience-based recommendation tool 105 to users 110. Each media file 130A through 130N of set of media 130 corresponds to a different branch of the non-linear branching story. Users 110 navigate through the story by choosing between various options presented by media files 130A through 130N. This disclosure contemplates that media files 130 may include any type of media. For example, media files 130 may include pre-recorded videos, live-streamed video, images, text, audio, virtual or augmented reality simulations, or any other appropriate form of media.

This disclosure contemplates that media files 130A through 130N may present options to users 110 in any suitable fashion. For example, in certain embodiments, media files 130A through 130N may present options to users 110 by displaying text on the screens of user devices 115. In some embodiments, media files 130A through 130N may present the options to users 110 by playing audio through the speaker systems of user devices 115. In certain embodiments, media files 130 may present audio and/or video to users and then followed by a display that presents options to users.

This disclosure contemplates that user 110 may interact with one or more media files of set of media 130 in any manner suitable to transmit his/her selection of a given option back to digital experience-based recommendation tool 105. As an example, user 110 may select one of a plurality of options by gesturing on the screen of his/her device 115 in a specified direction. For example, user 110 may select a first option by making a dragging gesture on the screen of his/her device 115 from the right side of the screen towards the left side of the screen or user 110 may select a second option by making a dragging gesture on the screen of his/her device 115 from the left side of the screen towards the right side of the screen. As another example, in certain embodiments, user 110 may select an option by entering a value using a keypad of device 115, or a keypad displayed on the screen of device 115. For example, user 110 may select between four options labelled A, B, C, and D, by entering one of A, B, C, or D into the keypad. As a further example, in certain embodiments, user 110 may select an option by tapping the screen of device 115. For example, user 110 may select a speed at which to virtually run from a first location to a second location by tapping the screen of device 115 a given number of times, with each tap increasing the current speed.

This disclosure contemplates that media 130 stored in database 125 may present a non-linear branching story to users 110 in any suitable format. For example, in certain embodiments, media 130 may provide users 110 with first-person point of view action videos. In certain embodiments, media 130 may provide users 110 with augmented reality experiences, by accessing the external facing cameras of devices 115 and displaying computer-generated graphics on the real-world surroundings of users 110. In further embodiments, media 130 may correspond to computer-generated, 3D simulations, with which users 110 interact by using specific hardware, such as virtual reality headsets and/or sensors 115.

In certain embodiments, database 125 may store customizable media 130, which digital experience-based recommendation tool 105 may customize for a given user 110 before transmitting the media to user 110. As an example, in certain such embodiments, digital experience-based recommendation tool 105 may customize a media file 130A for user 110A by placing the user's face into media file 130A, using a profile photo of user 110A stored in profile 135A assigned to user 110A. For example, media file 130A may be a first-person point of view video that includes a sequence in which user 110A looks into a mirror. Accordingly, digital experience-based recommendation tool 105 may use the profile photo of user 110A to generate an image of user 110A to display in the mirror. As another example, in certain such embodiments, digital experience-based recommendation tool 105 may customize a given media file 130A for user 110A by placing information from the user's profile 135A into the options presented by media file 130A. For example, media file 130A may present user 110A with a choice to attend a sporting event at his/her alma matter or a sporting event at a rival school, based on the education information user 110A has included in his/her profile 135A. Similarly, media file 130A may present user 110A with a choice to listen to one of several songs, where the song choices presented are songs that user 110A has linked to and/or included in his/her profile 135A. As another example, in certain embodiments, digital experience-based recommendation tool 105 may customize the options presented by media files 130 to user 110A, based on personality attributes of user 110A that the tool has previously determined. For example, digital experience-based recommendation tool 105 may determine that user 110A is extroverted, based on previous responses 170A provided by user 110A. Accordingly, digital experience-based recommendation tool 105 may customize media 130 to include a greater percentage of options that are associated with extroverted personality types, rather than introverted personality types. For example, when probing the user's introversion/extroversion personality traits, rather than presenting user 110A with equal numbers of extroverted choices and introverted choices, digital experience-based recommendation tool 105 may present user 110A with predominantly extroverted choices (e.g., a mix of 80% extroverted choices and 20% introverted choices). This may be desirable to keep user 110A interested in the digital event and/or to fine tune the user's extroversion score. As a further example, in certain embodiments, digital experience-based recommendation tool 105 may customize media 130 to present certain options only to a portion of users 110. For example, digital experience-based recommendation tool 105 may add options to media 130 associated with exclusive branches in the non-linear branching story. These exclusive options may be available to users 110 who have participated in at least a threshold number of previous digital events, and/or to users who have paid for access to exclusive media, or the opportunity to view and match with exclusive user profiles.

In certain embodiments, database 125 may store a single first media file 130A, such that each of users 110A through 110C, participating in the non-linear branching story, receives the same first media file 130A at the start of the digital event. In certain embodiments, database 125 may store multiple first media files 130A, such that users 110A through 110C may each receive different first media files 130A at the start of the digital event. For example, in certain embodiments, the first media files 130A that user 110 receives may depend on the last media file 130N that user 110 received in a previous story or event that user 110 participated in. This may be desirable to provide continuity among different stories/events, which may help encourage users 110 to participate in future events.

This disclosure contemplates that database 125 stores media 130 associated with a branching story that is non-linear, such that for a given story containing a series of N binary decisions, database 125 stores fewer than $2^N$ final media files 130. For example, in certain embodiments, database 125 may store fewer than ten final media files 130. This may be desirable, to help ensure that a large number of users 110 experience the same ending for the branching story, such that generating recommendations among users 110 may be based in part on the endings that users 110 experience. For example, in certain embodiments, digital experience-based recommendation tool 105 may recommend only those users who experience the same ending to one another, while in some embodiments, the endings that users 110 experience may be a factor considered by the recommendation algorithm of digital experience-based recommendation tool 105. The non-linear nature of the branching story is described in further detail below, in the discussion of FIG. 2.

As mentioned above, database 125 additionally stores a set of user profiles 135. User profiles 135 define or represent features of users 110. Profiles 135 may be available to the general public, to those that are members of the online dating system, and/or to a specific category of those members of the online dating system. Profiles 135 may contain information that was solicited from users 110 when users 110 set up their online dating accounts or was otherwise input by such users into their profiles. Profiles 135 may include general information such as age, height, gender, and occupation, as well as detailed information that may include the users' interests, likes/dislikes, personal feelings, and/or outlooks on the world.

In certain embodiments, profiles 135 may include information provided by users 110 as well as information automatically generated by digital experience-based recommendation tool 105 based on responses 170 provided by users 110 to tool 105. For example, in certain embodiments, digital experience-based recommendation tool 105 may group each of the options presented by media files 130 into a set of personality categories, assign scores to each of the options within a personality category, and use responses 170 to assign scores to users 110 in each of the personality categories. Digital experience-based recommendation tool 105 may then display these scores on profiles 135. As an example, in certain such embodiments, digital experience-based recommendation tool 105 may group the options presented by media 130 into personality categories including extroversion, adventurousness, risk tolerance, and spontaneity. For example, a response 170 containing a choice to attend a party rather than staying home may increase a user's extroversion score, and a response 170 containing a decision to get a tattoo rather than attend a concert may increase a user's risk tolerance and spontaneity scores. This disclosure contemplates that multiple decisions made by a user while participating in a digital event may contribute to the same personality category. For example, in addition to the choice between attending a party or staying home, a decision between going backstage and meeting the lead singer of a band, or staying in the general audience of a concert may also impact a user's extroversion score. Additionally, this disclosure contemplates that decisions contributing to a given personality category need not occur in the same digital event. For example, during a first digital event, a user may choose to attend the party rather than stay home, thereby increasing the user's extroversion score. This user may choose to go backstage and meet the lead singer of the band rather than stay in the general audience of the concert during a second digital event, thereby increasing the user's extroversion score. Determining personality trait scores based on responses 170 and displaying these scores as part of a user's profile 135 may be desirable, as determining a user's personality traits based on decisions he/she makes during a digital experience may lead to a more accurate representation of the user's personality than relying on the user's own input. This may be especially true in situations in which user 110 may otherwise provide false or idealized information if asked to fill out the profile information himself/herself. Additionally, users 110 may be more willing to provide profile information by participating in a digital event than by answering questions and/or filling in fields.

As seen in FIG. 1, digital experience-based recommendation tool 105 includes processor 140, memory 145, and interface 150. This disclosure contemplates processor 140, memory 145, and interface 150 being configured to perform any of the functions of digital experience-based recommendation tool 105 described herein. Generally, digital experience-based recommendation tool 105 implements response analyzer 155 and recommendation engine 160.

Response analyzer 155 receives responses 170A from users 110, stores responses 170A in memory 145 as a set of responses 170 for each user 110, and uses responses 170A to determine which media files of media 130 to send to users 110. At the start of a digital event, response analyzer 155 may direct interface 150 to transmit first media file 130A to users 110, through processor 140. In certain embodiments, first media file 130A is the same for each user 110. In some embodiments, media 130 may contain multiple first media files 130A, such that response analyzer 155 may direct interface 150 to transmit different first media files 130A to each of users 110A through 110C at the start of the digital event. For example, in certain embodiments, first media file 130A that user 110A receives may depend on last media file 130N that user 110A received during a previous digital event. Transmitting first media file 130A that depends on last media file 130N that user 110 received during a previous event may be desirable to provide continuity among different digital stories/events, which may help encourage users 110 to participate in future events.

In certain embodiments, prior to directing interface 150 to transmit a given media file or set of media 130 to user 110, response analyzer 155 may first determine whether the current time is within a time interval specified for the digital event. For example, in certain embodiments, the digital event is a live event of a specified duration in time, such that users 110 may only participate in the digital event during that specified time. In some embodiments, users 110 may participate in the digital event on-demand, such that response analyzer 155 may direct interface 150 to transmit a given media file of set of media 130 to user 110 at any time. In some embodiments, users 110 may participate in the digital event on-demand, but only at limited, pre-identified times. For example, a recorded version of an originally live-streamed digital event may be offered at a specified time or times, due to the popularity of the original, live-streamed version of the event.

Each media file of set of media 130 may be configured to present a set of options to users 110 to enable users 110 to navigate through the non-linear branching story comprising the digital event. Accordingly, after directing interface 150 to transmit first media file 130A to user 110A, response analyzer 155 may receive response 170A, containing a choice made by user 110A of one of the options of the set of options presented to user 110A by first media file 130A. In response to receiving response 170A, response analyzer 155 saves response 170A to set of responses 170 stored in memory 145 and determines second media file 130B to transmit to user 110A, based on response 170A. To determine second media file 130B to transmit to user 110A, response analyzer 155 consults a decision tree stored in memory 145, database 125, or any other suitable location. For a given media file 130A of set of media 130, the decision tree associates each option of the set of options presented by media file 130A with a further media file of set of media 130. For example, if media file 130A presents user 110 with an option A and an option B, the decision tree may associate option A with second media 130B and option B with third media file 130C. While this example considered a pair of options—option A and option B—this disclosure contemplates that each media file may present user 110 with any number of options, including options such as "skip," "no choice," or any other option indicating that user 110 does not have a preference. In response to receiving response 170A from user 110A, response analyzer first analyzes response 170A to determine the option chosen by user 110A and then determines media file 130B associated with this option, using the decision tree. Response analyzer 155 then instructs processor 140 to direct interface 150 to transmit media file 130B to user 110A. This process repeats until response analyzer 155 instructs processor 140 to direct interface 150 to transmit final media file 130N, associated with the end of the digital event, to user 110A. An example decision tree along with a detailed discussion of the use of the decision tree by response analyzer 155 is presented below, in the discussion of FIG. 2.

In certain embodiments, response analyzer 155 may receive response 170A from user 110 only if response 170A is transmitted to interface 150 within a threshold period of time. For example, in certain embodiments, users 110 may only have a set time interval during which to select an option of a set of options presented to them by media file 130. For example, in certain such embodiments, users 110 may have seven seconds during which to select an option of a set of options presented to them by media file 130. In certain embodiments, if user 110A does not select an option of a set of options presented to him/her by media file 130 within the threshold time period, response analyzer 155 may select one of these options and direct interface 150, through processor 140, to transmit media file 130 associated with the selected option to user 110A. In some embodiments, response analyzer 155 may also select an option of the set of possible options other than "skip," "no choice," or any other no preference option, when the set of options contains "skip," "no choice," or any other no preference options, and the user selects one of the "skip," "no choice," or other options indicating that the user does not have a preference. In certain embodiments, response analyzer 155 may store the selected option in memory 145 along with a weight of zero, indicating to recommendation engine 160 that this selected option should not be taken into account in matching user 110A to other users 110. This disclosure contemplates that response analyzer 155 may select one of the options in any suitable manner. For example, in certain embodiments, response analyzer 155 may be configured to 1) randomly select one of the options from the set of possible options; 2) select a pre-determined option; 3) select the first option of the set of possible options; 4) select the most popular option of the set of possible options, as determined from responses 170 provided by other users; 5) select an option of the set of possible options based on determined or supplied personality traits of the user, e.g., an adventurous option from the set of possible options for user 110A, based on a determination from previous responses 170 supplied by user 110A that user 110A is adventurous, or an extroverted option from the set of possible options for user 110A, based on user 110A indicating that he/she is extroverted in information (other than responses 170) supplied by user 110A to generate his/her profile 135A; or 6) use any other factor to select among the available options. Encouraging user 110A to select an option within a brief interval of time may be desirable to spur the user to act on his/her instincts rather than overthinking the various options, potentially increasing the likelihood that the user's choice accurately reflects his/her personality traits.

In certain embodiments, response analyzer 155 may determine which media files 130 to send to a user 110A based not only on responses 170A received from user 110A, but also on responses 170B through 170C received from other users 110B through 110C. For example, in certain embodiments, the digital event may be a live-streamed event, which presents users with a set of options from which the users may vote for their favorites. As an example, the digital event may be a live singing competition where users 110 are able to vote for their favorite contestants. In such embodiments, response analyzer 155 may determine the most popular choice from responses 170 and determine a single media file 130 to send to all participating users 110 based on the most popular choice. For example, first media file 130A may consist of a first round of a singing competition that asks users 110 to choose a favorite from three contestants. Even if user 110A selects the second contestant as his/her favorite, user 110A may nevertheless receive a second media file 130B consisting of a second round of the singing competition in which the second contestant has been eliminated, based on the second contestant receiving the fewest votes, as determined from responses 170. Nevertheless, while not impacting the media files 130 that user 110A receives, user 110A's choice may be used by digital experience-based recommendation to generate recommendations of potentially compatible users for user 110A. For example, user 110A may receive recommendations 175 of other users who also chose the second contestant as their favorite.

Response analyzer 155 may be a software module stored in memory 145 and executed by processor 140. An example algorithm for response analyzer 155 is as follows: set the current media file to first media file 130A; while the current media file is not the final media file 130N: {instruct interface 150 to transmit the current media file to user 110A; receive response 170A from user 110A through interface 150 containing a choice of a set of choices presented by the current media file; save the choice to the set of responses 170 stored in memory 145; locate the choice in the decision tree; determine a media file 130B assigned to the choice; set the current media file to media file 130B}; instruct interface 150 to transmit final media file 130N to user 110A.

As described above, digital experience-based recommendation tool 105 additionally includes recommendation engine 160. Recommendation engine 160 generates recommendations 175 between users 110 participating in the digital event. For a given user 110A, recommendations 175 may include those users 110 determined by recommendation engine 160 to likely be compatible with user 110A. This disclosure contemplates that recommendation engine 160 may determine compatibility between users 110 based at least in part on the choices made by users 110 (and stored in response analyzer 155 in the set of responses 170) as they navigate through the non-linear branching story presented during the digital event. For example, in certain embodiments, recommendation engine 160 determines that first user 110A is compatible with second user 110B, based on the fact that both first user 110A and second user 110B made choices during the digital event that led them to the same final media file 130N. In such embodiments, recommendation engine 160 may present all those users who received the same final media file 130N as first user 110A as recommendations 175 to user 110A.

In certain embodiments, for each subject user 110A through 110C, recommendation engine 160 may determine a ranked list of other users 110 that are potentially compatible with the subject user, where recommendation engine 160 presents users 110 according to the number of choices they made that were the same as the choices made by subject user 110A during the event. For example, recommendation engine 160 may determine a ranked list for first user 110A containing second user 110B ranked higher than third user 110C, based on the fact that second user 110B made three choices that were the same as choices made by first user 110A, while third user 110C only made one choice that was the same as a choice made by first user 110A. In certain such embodiments, digital experience-based recommendation tool 105 may assign weights to each set of options presented to users 110, such that certain choices are weighed more heavily than others. For example, second user 110B may have made three choices that were the same as choices made by first user 110A, where such choices included: (1) opening a door on the left rather than a door on the right; (2) playing a game of darts rather than a game of pool; and (3) traveling east rather than traveling west. As these choices may not be highly probative of a user's personality traits, digital experience-based recommendation tool 105 may assign smaller weights to them than other choices. On the other hand, third user 110C may have made one choice that was the same as a choice made by first user 110A, where the choice consisted of a decision to go sky diving rather than to watch a movie. As this decision may be highly probative of a user's adventurousness, digital experience-based recommendation tool 105 may assign a large weight to it. Accordingly, recommendation engine 160 may rank third user 110C as likely more compatible than second user 110B based on the large weight assigned to the one decision in common between first user 110A and third user 110C, despite the fact that third user 110C and first user 110A only had this one decision in common, while second user 110B and first user 110A had three decisions in common.

In certain embodiments, rather than determining the number of choices a given user 110A has in common with the other users 110B and 110C, recommendation engine 155 may assign a set of scores to each user 110, based on the decisions that the user made during the digital event. Recommendation engine 155 may then recommend users to one another based on the similarity of their scores. The set of scores may include scores covering a range of different personality categories. For example, the set of scores may include an extroversion score, an adventurousness score, a risk tolerance score, and a spontaneity score. In such embodiments, recommendation engine 160 may group each set of options presented by media files 130 into one or more personality categories and assign a score to each option within a given category. For example, a set of options that includes a choice between staying home or attending a party may be assigned to an extroversion category, with a score of −50 assigned to the decision to stay home and a score of +50 assigned to the decision to attend the party. This disclosure contemplates that multiple decisions made by a user while participating in a digital event may contribute to the same personality category. For example, in addition to the choice between attending a party or staying home, a decision between going backstage and meeting the lead singer of a band or staying in the general audience of a concert may also impact a user's extroversion score. Here, the decision to go backstage may be assigned a score of +20, while a decision to stay in the general audience may be assigned a score of −10. Additionally, this disclosure contemplates that decisions contributing to a given personality category need not occur in the same digital event. For example, during a first digital event, a user may choose to attend the party rather than stay home, thereby increasing the user's extroversion score. This user may also choose to go backstage and meet the lead singer of the band rather than stay in the general audience of the concert during a second digital event, thereby further increasing the user's extroversion score.

Recommendation engine 160 may determine a set of scores for user 110A by determining the scores assigned to each of the options chosen by user 110A and summing the scores within each personality category. For example, recommendation engine 160 may determine the following sets of scores for users 110A through 110C, where a positive score indicates the presence of the given personality trait and a negative score indicates the presence of the opposite personality trait:

|  | Extroversion | Adventurousness | Risk Tolerance | Spontaneity |
| --- | --- | --- | --- | --- |
| User 110A | 100 | 200 | 50 | −50 |
| User 110B | −20 | −20 | −100 | −10 |
| User 110C | 50 | 300 | 50 | 0 |

These scores indicate a higher probability that users 110A and 110C are extroverted, highly adventurous, and risk tolerant, in contrast to second user 110B who has a higher probability of being introverted, timid, and risk avoidant. Accordingly, based on a direct comparison of these sets of scores, recommendation engine 160 may determine that third user 110C is likely more compatible with first user 110A than with second user 110B. In certain embodiments, rather than directly comparing personality trait scores across users 110A through 110C, recommendation engine 160 may employ a machine-learning algorithm trained to generate ranked lists of compatible users 110 based on attributes that may include the users' personality trait scores.

This disclosure contemplates that recommendation engine 160 may consider any number of factors, in addition to the responses 170 received from users 110, to determine matches 175 among the users 110 and to rank these matches. As an example, in embodiments in which recommendation engine 160 employs a machine-learning algorithm trained to generate ranked lists of compatible users 110 based on attributes that include the users' personality trait scores, the machine-learning algorithm may operate on additional attributes obtained from profiles 135 in a manner similar to the systems described in, for example, U.S. Pat. No. 9,733,811, the entire disclosure of which, except for any definitions, disclaimers, disavowals, and inconsistencies, is incorporated herein by reference. In such embodiments, the personality trait scores determined by tool 105 may be placed in a user's profile 135, such that a machine-learning algorithm configured to extract and operate on attributes obtained from profiles 135 may easily incorporate the additional attributes associated with the personality trait scores placed into profiles 135. As another example, in certain embodiments, recommendation engine 160 may determine recommendations based on information contained in profiles 135 and then rank these recommendations (and/or select a subset of these recommendations), based on the similarity of the choices made by the users during the digital event. As another example, in certain embodiments, recommendation engine 160 may consider the ages, genders, and locations of users 110 in determining recommendations 175. For example, recommendation engine 160 may provide user 110A with recommendations 175 that correspond to users 110 that fall within the age, gender, and/or location ranges specified by user 110A. As another example, in certain embodiments in which the recommendations 175 generated for user 110A consist of a ranked list of potentially compatible users, recommendation engine 160 may prioritize user 110B who has previously viewed profile 135A belonging to user 135A, by increasing the ranking of user 110B within user 110A's ranked list. This may be desirable as previous profile views may indicate that user 110B has an interest in user 110A and may therefore be likely to match with user 110A, when presented with a recommendation of user 110A. As a further example, in certain embodiments in which the recommendations 175 generated for user 110A consist of a ranked list of potentially compatible users, recommendation engine 160 may prioritize user 110B within the ranked list, based on the number of previous digital events user 110B has participated in. For example, recommendation engine 160 may increase the ranking of user 110B who is participating in his/her first digital event. This may be desirable to help ensure that users 110 who frequently participate in digital events have the opportunity to match with new users, rather than continually receiving recommendations of the same set of users.

In certain embodiments, recommendations 175 generated by recommendation engine 160 for user 110A may be available to user 110A throughout the duration of the digital event, but may be unavailable after the digital event has ended. For example, in certain embodiments, a digital event may last until midnight, after which user 110A is no longer able to match with other users who shared the same digital experiences as user 110A during the event. This may be desirable to help ensure that those users 110 provided with recommendations of user 110A are active on the system at or around the time of the recommendation, helping to facilitate communication between those users and user 110A. Additionally, in some embodiments, the number of recommendations presented to a user 110A may continue to increase over the duration of the digital event. For example, a digital event may last from 6 PM to 12 PM on a specified date. User 110A may complete the digital event at 7:00 PM, receiving recommendations 175 consisting of other users 110 who have similarly completed the digital event at or before 7:00 PM. As the evening progresses, user 110A may receive additional recommendations 175 as more users 110 complete the digital event, up until the end of the digital event, at 12 PM. For example, at the time user 110A completes the digital event, responses 175 may only contain 20 recommendations of potentially compatible users; however, by the end of the digital event, responses 175 may contain 300 recommendations of potentially compatible users. In certain embodiments, recommendations 175 generated by recommendation engine 160 for user 110A may be continually available to user 110A even after the digital event has ended.

In certain embodiments, recommendations 175 generated by recommendation engine 160 may include user profiles 135. In some embodiments, recommendations 175 may include portions of user profiles 135, such as profile pictures, may be purely textual representations of user profiles, or may include images, i.e., graphical representations of user profiles. In further embodiments, recommendations 175 may include avatars generated by users 110, rather than photographs in user profiles 135. In such embodiments, user 110A may be able to see a photograph in user profile 135B (rather than an avatar) of the user only if both user 110A and user 110B choose to match with each other. The use of avatars may be desirable for users 110A wishing to maintain anonymity. The use of avatars may also be desirable as it may help to encourage users 110 to select matches 175 based on personality traits rather than personal appearance, potentially leading to more meaningful matches. In some embodiments, users 110 may select certain customizations for their profiles and/or avatars. For example, users 110 may select certain skins, badges, avatars, accessories, or any other customizations that are shown in the digital experience. In some embodiments, users 110 may provide payment for these customizations.

In certain embodiments, recommendations 175 generated by recommendation engine 160 for user 110A may be available to user 110A only after user 110A has completed the non-linear branching story presented during the digital event. In some embodiments, certain recommendations 175 may be presented to user 110A throughout the non-linear branching story. As an example, in certain embodiments, certain branches of the non-linear branching story may provide for participation by more than one user, such that users 110 who have navigated along the same path in the non-linear branching story as user 110A may be presented to user 110A. For example, after choosing to open a door, media file 130 may inform user 110A that he/she is now in a room with users 110B and 110C and must cooperate with users 110B and 110C to determine a way out of the room. In such embodiments, digital experience-based recommendation tool 105 may enable voice and/or text communication among users 110A through 110C while they are interacting with one another in the story.

As another example, in certain embodiments, digital experience-based recommendation tool 105 may select pairs of users 110A and 110B and/or groups of users to participate in the non-linear branching story together. For example, digital experience-based recommendation tool 105 may select pairs of users 110A and 110B who were previously determined by the tool to likely be compatible with one another to participate in the story together. Digital experience-based recommendation tool 105 may have determined users 110A and 110B to likely be compatible based on shared choices these users made during a previous digital event or based on personality attributes generated from profiles 135A and 135B belonging to users 110A and 110B. By encouraging users 110A and 110B to participate in the digital event together, digital experience-based recommendation tool 105 may enable users 110A and 110B to assess their compatibility with one another before ever meeting in person. This may be desirable, as sharing a digital experience with one another may provide more meaningful compatibility information to a pair of users than the information that may be gained through messages sent back and forth between the two users.

In embodiments in which digital experience-based recommendation tool 105 introduces user 110B to user 110A at either the beginning of the digital event or at a point during the digital event, recommendation engine 160 may present each of users 110A and 110B with a recommendation of the other user at the end of the event (or at a point in time during the event) such that these users may choose to match with one another. If both user 110A and user 110B choose to match with one another, recommendation engine 160 may allow user 110A and user 110B to communicate with one another outside of the digital event. However, if either of user 110A or user 110B chooses not to match with the other user, recommendation engine 160 may discard profile 135A from user 110B's recommendations 175 and discard profile 135B from user 110A' s recommendations 175.

In certain embodiments, in addition to digital experience-based recommendation tool 105 selecting users 110 to participate in the digital event together, groups of two or more users 110 may choose to participate in the digital event together. As an example, a pair of users 110A and 110B who have been recommended to one another based on information contained in their profiles 135 may choose to participate in a digital event to gain insight into their compatibility with one another. As another example, in certain embodiments, a group of users 110A through 110C, who know each other, may choose to participate in the digital event together. This disclosure contemplates that digital events in which groups of users may participate together include games consisting of competing teams, in which each group of users is assigned to a team, as well as games where users may participate cooperatively. In certain embodiments consisting of groups of users participating in the digital event together, recommendations 175 generated by recommendation engine 160 may consist of other groups of users who made similar choices to the group of users 110A through 110C during the event. Generating recommendations of groups rather than individuals may be desirable as it may provide a greater number of individuals to potentially match with, given that groups of friends are often composed of individuals who are compatible with one another. Additionally, allowing groups of friends to participate with one another may increase the users' enjoyment of the event, encouraging future participating in additional digital events.

In certain embodiments, in addition to generating recommendations among users 110, recommendation engine 160 may use set of responses 170 stored in memory 145 for each user 110 to generate profile information for the user. For example, in embodiments in which recommendation engine 160 determines personality trait scores for each user 110 based on responses 170, recommendation engine 160 may also store and/or display these personality trait scores in profiles 135 assigned to users 110. This may be desirable, as determining a user's personality traits based on decisions he/she makes during a digital experience may lead to a more accurate representation of the user's personality than relying on the user's own input. Additionally, users 110 may be more willing to provide profile information by participating in a digital event than by answering questions and/or filling in fields.

Recommendation engine 160 may be a software module stored in memory 145 and executed by processor 140. An example algorithm for recommendation engine 160, used to determine recommendation 175 for first user 110A, is as follows: set a recommendation variable equal to 0; set a recommendation counter equal to 0; for each user $110i$ !=user 110A: {compare responses $170i$ received from user $110i$ to responses 170A received from user 110A; determine the number of responses $110i$ that are the same as responses 110A; if the number of responses $110i$ that are the same as responses 110A is greater than the recommendation counter value: {set the recommendation counter value equal to the number of responses $110i$ that are the same as responses 110A; set the recommendation variable equal to user $110i$}}; store the user stored in the recommendation variable as a recommendation 175. The above algorithm may be repeated for the remaining users to determine additional recommendations 175 for user 110A.

Processor 140 may be any electronic circuitry, including, but not limited to microprocessors, application specific integrated circuits (ASIC), application specific instruction set processor (ASIP), and/or state machines, that communicatively couples to memory 145 and interface 150 and controls the operation of digital experience-based recommendation tool 105. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of digital experience-based recommendation tool 105 by processing information received from network 120, device(s) 115, interface 150, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Interface 150 represents any suitable device operable to receive information from network 120, transmit information through network 120, perform suitable processing of the information, communicate to other devices, or any combination of the preceding. For example, interface 150 transmits media files of the set of media files 130 to devices 115. As another example, interface 150 receives responses 170 from devices 115. Interface 150 represents any port or connection, real or virtual, including any suitable hardware and/or software, including protocol conversion and data processing capabilities, to communicate through a LAN, WAN, or other communication systems that allows digital experience-based recommendation tool 105 to exchange information with devices 115 and/or other components of system 100 via network 120.

In certain embodiments, interface 150 may customize media 130 prior to transmitting it to users 110. For example, in certain embodiments, interface 150 may customize media file 130A by using a profile photo of user 110A to add the user's face to media file 130A. For example, media file 130A may be a first-person point of view video that includes a sequence in which user 110A looks into a mirror. Interface 150 may use a profile photo of user 110A stored in profile 135A assigned to user 110A, to customize media file 130A by generating an image of user 110A to display in the mirror. As another example, in certain such embodiments, interface 150 may customize media file 130A for user 110A by placing information from the user's profile 135A into the options presented by media file 130A. For example, media file 130A may present user 110A with a choice between attending a sporting event at his/her alma matter or attending a sporting event at a rival school, based on education information that user 110A has included in his/her profile 135A. Similarly, media file 130A may present user 110A with a choice to listen to one of several songs, where the songs presented are songs that user 110A has linked to his/her profile 135A. As another example, in certain embodiments, interface 150 may customize the options presented by media 130 to user 110A, based on personality attributes of user 110A that digital experience-based recommendation tool 105 has previously assessed. For example, digital experience-based recommendation tool 105 may determine that user 110A is extroverted, based on previous responses 170A provided by user 110A. Accordingly, interface 150 may customize media 130 to include a greater percentage of options that are associated with extroverted personality types, rather than introverted personality types. For example, rather than presenting user 110A with equal numbers of extroverted choices and introverted choices, when probing the user's introversion/extroversion, interface 150 may present user 110A with predominantly extroverted choices (e.g., a mix of 80% extroverted choices and 20% introverted choices). This may be desirable to keep user 110A interested in the digital event and to fine tune the user's extroversion score. As a further example, in certain embodiments, interface 150 may customize media 130 to present certain options only to a portion of users 110. For example, interface 150 may add options to media 130 associated with exclusive branches in the non-linear branching story. These exclusive options may be available to users 110 who have participated in at least a threshold number of previous digital events, and/or to users who have paid for access to exclusive media, or the opportunity to view and match with exclusive user profiles. For example, user 110A and 110B may be presented with an option to attend an exclusive concert by providing payment, while user 110C may not be presented with this option and/or indicate it as an option only through payment. In this example, users 110A and 110B would be provided access to exclusive matches with each other and others who pay to attend the virtual exclusive concert, while user 110C would not be provided with such access.

In certain embodiments, users 110 may pay for other exclusive options to enhance their digital experience and add temporary benefits or extra abilities. For example, users 110 may boost one or more of their decisions to make them more prominent on their profile (e.g., highlight that user 110A chose skydiving over staying at home in the digital event) and/or receive the ability to see other users who made the same decision. As another example, users 110 may be able to revise a previous decision by replaying or undoing the decision to select a different option. In certain embodiments, users 100 may provide digital gifts during the digital event that may be presented to another user during or at the end of the event. For example, user 110A may select an option to buy a virtual rose during the digital event and at the end may choose to present that rose to user 110B. This may be desirable as a way for users 110 to interact in a different manner, and to increase the likelihood of matches from the digital event (e.g., user 110A is able to make user 110B know of their affection). As an additional example, in an experience where users 110 are faced with an obstacle or puzzle (e.g., escape room), users 110 could pay for a shortcut or clue to aid in solving the issue.

In certain embodiments, digital experience-based recommendation tool 105 provides enhanced recommendations to users 110 participating in a digital event, by recommending users 110 to one another based on their shared digital experiences during the event. Users participating in the event navigate through a non-linear branching story transmitted by the tool to their devices 115 through media 130, by selecting among various options presented by the media. Certain of these options may be designed to probe various aspects of the users' personalities, such that users who select the same options are likely to have similar personalities to one another and may therefore be compatible in a dating context. Accordingly, at the end of the event, the tool generates recommendations for users based at least in part on the choices they made throughout the event. In this manner, certain embodiments of the tool enable geographically separated, compatible users to connect with one another.

Modifications, additions, or omissions may be made to the systems described herein without departing from the scope of the invention. For example, system 100 may include any number of users 110, devices 115, networks 120, and databases 125. The components may be integrated or separated. Rather than transmitting the media files 130 to users sequentially, digital experience-based recommendation tool 105 may transmit some or all media files 130A through 130N to the user at the outset of an event or prior to an event so that the operations required to create the digital event may be completed by the user's device 115. Moreover, the operations may be performed by more, fewer, or other components. Additionally, the operations may be performed using any suitable logic comprising software, hardware, and/or other logic. As used in this document, "each" refers to each member of a set or each member of a subset of a set.

Figure 2:
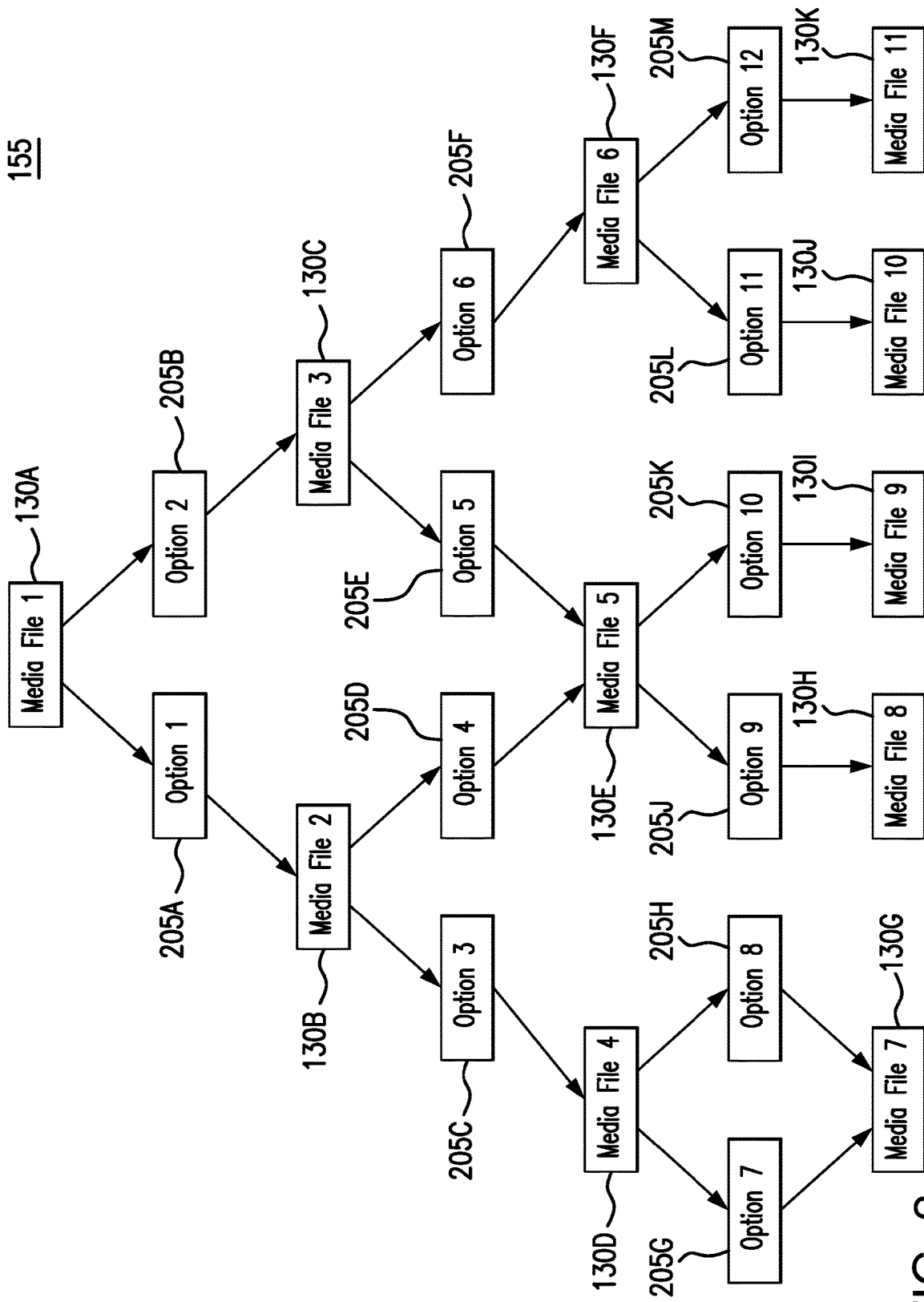
FIG. 2 presents an example decision tree, illustrating the non-linear, branching nature of the story generated by the digital experience-based recommendation tool of the system of FIG. 1.

FIG. 2 presents an example of a non-linear branching story presented to users 110 by digital experience-based recommendation tool 105. This disclosure contemplates that the story presented to users 110 may consist of any type of media. For example, the media may include pre-recorded videos, live-streamed video, images, text, audio, virtual or augmented reality simulations, or any other appropriate form of media. FIG. 2 illustrates an example story from an embodiment of digital experience-based recommendation tool 105 in which each user 110 is presented with the same media file 130A at the start of the story. However, this disclosure also contemplates that different users 110 may each receive different first media files 130A at the start of the digital event. For example, in certain embodiments, first media file 130A that user 110A receives may depend on last media file 130N that user 110A received in a previous digital event. This may be desirable to provide continuity among different stories, which may help encourage users 110 to participate in future digital events. Additionally, while FIG. 2 illustrates an embodiment of digital experience-based recommendation tool 105 in which each media file 130A through 130K provides a choice between two options, this disclosure contemplates that media files 130 may provide users 110 with a choice of any number of different options. Furthermore, these options may include options such as "skip," "no choice," or any other option indicating that user 110 does not have a preference among any of the presented options.

As can be seen in FIG. 2, first media file 130A presents user 110 with a choice between first option 205A and second option 205B. First option 205A is associated with second media file 130B while second option 205B is associated with third media file 130C, such that if user 110 selects first option 205A, digital experience-based recommendation tool 105 transmits second media file 130B to the user, while if user 110 selects second option 205B, digital experience-based recommendation tool 105 transmits third media file 130C to the user. Each of second media file 130B and third media file 130C is configured to present its own options, illustrated in FIG. 2 as third option 205C and fourth option 205D for second media file 130B, and fifth option 205E and sixth option 205F for third media file 130C.

This disclosure contemplates that the branching story presented by digital experience-based recommendation tool 105 is a non-linear branching story. FIG. 2 presents two examples of such non-linearity. First, as illustrated by fifth media file 130E, selecting options presented by different media files 130—here, fourth option 205D and fifth option 205E—may both cause digital experience-based recommendation tool 105 to transmit the same media file 130E to users 110 making these selections. Accordingly, even though first user 110A and second user 110B may have selected different options presented by first media file 130A—for example, first user 110A may have selected first option 205A and second user 110B may have selected second option 205B—they may nevertheless still be presented with the same ending media file—eighth media file 130H or ninth media file 130I—if first user 110A selects fourth option 205D in response to second media file 130B and second user 110B selects fifth option 205E in response to third media file 130C.

Fourth media file 130D presents another example of non-linearity in the branching story illustrated by FIG. 2. While fourth media file 130D presents two options (seventh option 205G and eighth option 205H), both of these options lead to the same media file—seventh media file 130G. For example, seventh option 205G and eight option 205H may correspond to a choice between opening a door on the right or opening a door on the left. As neither option may be particularly probative of a user's personality traits, both options may simply lead to the same result.

Due to the non-linear nature of the branching story, this disclosure contemplates that the story may contain fewer than $2^N$ final media files, where N corresponds to the number of decisions user 110 is asked to make while navigating through the story. As seen in FIG. 2, rather than containing eight final media files, the story presented in FIG. 2 contains only five-seventh media file 130G, eighth media file 130H, ninth media file 130I, tenth media file 130J, and eleventh media file 130K. This may be desirable, to help ensure that a large number of users 110 experience the same ending for the branching story, such that recommendations 175 among users 110 may be generated based in part on the endings that users 110 experience.

Figure 3:
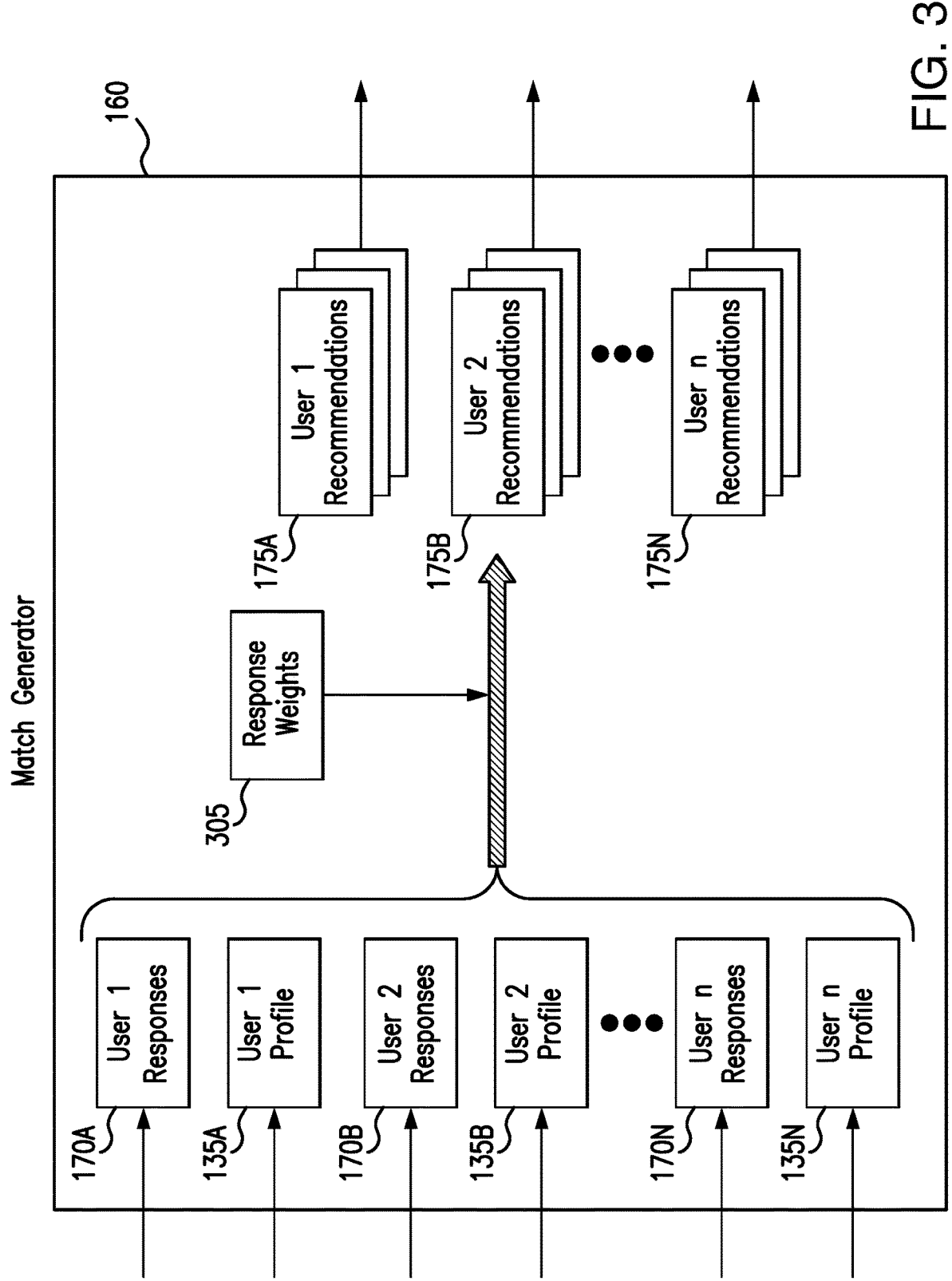
FIG. 3 illustrates the recommendation engine of the digital experience-based recommendation tool of the system of FIG. 1.

FIG. 3 illustrates recommendation engine 160 of digital experience-based recommendation tool 105. As seen in FIG. 3, in certain embodiments, recommendation engine 160 determines recommendations 175A through 175N for users 130A through 130N based on responses 170A through 170N submitted by the users and profiles 135A through 135N belonging to the users. However, this disclosure additionally contemplates that in certain embodiments, recommendations 175A through 175N may be determined solely from responses 170A through 170N, while in some embodiments, recommendations 175A through 175N may be determined from responses 170A through 170N in addition to any number of different factors, including, but not limited to profiles 135A through 135N.

For a given user 110A, recommendation 175A may include those users 110B through 110N determined by recommendation engine 160 to likely be compatible with user 110A. This disclosure contemplates that recommendation engine 160 determines compatibility between users 110 based at least in part on the choices made by users 110 (illustrated as responses 170A through 170N) as they navigate through the non-linear branching story presented during the digital event. For example, in certain embodiments, recommendation engine 160 determines that first user 110A may be compatible with second user 110B, based on the fact that both first user 110A and second user 110B made choices during the digital event that led them to the same final media file 130N.

In certain embodiments, for each subject user 110A through 110N, recommendation engine 160 determines a ranked list of other users 110 that are potentially compatible with the subject user, where recommendation engine 160 ranks those users 110 in each list in part according to the number of choices they made that were the same as the choices made by subject user 110A during the event. For example, recommendation engine 160 may determine a ranked list for first user 110A containing second user 110B ranked higher than third user 110C, based on the fact that second user 110B made three choices that were the same as choices made by first user 110A, while third user 110C only made one choice that was the same as a choice made by first user 110A. In certain such embodiments, digital experience-based recommendation tool 105 may assign weights 305 to each set of options presented to users 110, such that certain choices are weighed more heavily than others. For example, second user 110B may have made three choices that were the same as choices made by first user 110A, where such choices included: (1) opening a door on the left rather than a door on the right; (2) playing a game of darts rather than a game of pool; and (3) traveling east rather than traveling west. As these choices may not be highly probative of a user's personality traits, digital experience-based recommendation tool 105 may assign small weights 350 to them. On the other hand, third user 110C may have made one choice that was the same as a choice made by first user 110A, where the choice consisted of a decision to go sky diving rather than to watch a movie. As this decision may be highly probative of a user's adventurousness, digital experience-based recommendation tool 105 may assign a large weight 305 to it. Accordingly, recommendation engine 160 may rank third user 110C as likely more compatible than second user 110B based on the large weight assigned to the one decision in common between first user 110A and third user 110C, despite the fact that third user 110C and first user 110A only had this one decision in common, while second user 110B and first user 110A had three decisions in common.

In certain embodiments, recommendation engine 155 may assign a set of scores to each user 110A through 110N, based on the decisions that the user made during the digital event, and generate recommendations among users based on the similarity of their scores. The set of scores may include scores covering a range of different personality categories. For example, the set of scores may include an extroversion score, an adventurousness score, a risk tolerance score, and a spontaneity score. In such embodiments, recommendation engine 160 may group each set of options presented by media files 130A through 130N into one or more personality categories and assign a score to each option within a given category. For example, a set of options that includes a choice between staying home or attending a party may be assigned to an extroversion category, with a score of −50 assigned to the decision to stay home and a score of +50 assigned to the decision to attend a party. This disclosure contemplates that multiple decisions made by a user while participating in a digital event may contribute to the same personality category. For example, in addition to the choice between attending a party or staying home, a decision between going backstage and meeting the lead singer of a band or staying in the general audience of a concert may also impact a user's extroversion score. Here, the decision to go backstage may be assigned a score of +20, while a decision to stay in the general audience may be assigned a score of −10. Additionally, this disclosure contemplates that decisions contributing to a given personality category need not occur in the same digital event. For example, during a first digital event, a user may choose to attend the party rather than stay home, thereby increasing the user's extroversion score. This user may also choose to go backstage and meet the lead singer of the band rather than stay in the general audience of the concert during a second digital event, thereby further increasing the user's extroversion score.

Recommendation engine 160 may determine a set of scores for user 110A by determining the scores assigned to each of the options chosen by user 110A and summing the scores assigned to each personality category. For example, recommendation engine 160 may determine the following sets of scores for users 110A through 110C, where a positive score indicates the presence of the given personality trait and a negative score indicates the presence of the opposite personality trait:

|  | Extroversion | Adventurousness | Risk Tolerance | Spontaneity |
|---|---|---|---|---|
| User 110A | 100 | 200 | 50 | −50 |
| User 110B | −20 | −20 | −100 | −10 |
| User 110C | 50 | 300 | 50 | 0 |

These scores indicate a higher probability that users 110A and 110C are extroverted, highly adventurous, and risk tolerant, in contrast to second user 110B who has a higher probability of being introverted, timid, and risk avoidant. Accordingly, based on a direct comparison of these sets of scores, recommendation engine 160 may determine that third user 110C is likely more compatible with first user 110A than with second user 110B. In certain embodiments, rather than directly comparing personality trait scores across users 110A through 110N, recommendation engine 160 may employ a machine-learning algorithm trained to generate ranked lists of compatible users 110 based on attributes that include the users' personality trait scores.

This disclosure contemplates that recommendation engine 160 may consider any number of factors, in addition to responses 170 received from users 110, to determine recommendations 175A through 175N and rankings among users 110A through 110N. As an example, in embodiments in which recommendation engine 160 employs a machine-learning algorithm trained to generate ranked lists of compatible users 110 based on attributes that include the users' personality trait scores, the machine-learning algorithm may operate on additional attributes obtained from profiles 135A through 135N. In such embodiments, the personality trait scores determined by tool 105 may be placed in a user's profile 135, such that a machine-learning algorithm configured to extract and operate on attributes obtained from profiles 135 may easily incorporate the additional attributes associated with the personality trait scores placed into profiles 135. As another example, in certain embodiments, recommendation engine 160 may determine recommendations based on information contained in profiles 135A through 135N and then rank these recommendations, or select a subset of these recommendations, based on the similarity of the choices 170A through 170N made by the users during the digital event. As another example, in certain embodiments, recommendation engine 160 may consider the ages, genders, and locations of users 110 in determining recommendations 175A through 175N. For example, recommendation engine 160 may provide user 110A with recommendations 175A that correspond to users 110B through 110N that fall within age, gender, and/or location ranges specified by user 110A. As another example, in certain embodiments in which recommendations 175A generated for user 110A consist of a ranked list of potentially compatible users, recommendation engine 160 may prioritize user 110B who has previously viewed profile 135A belonging to user 135A, by increasing the ranking of user 110B. This may be desirable as previous profile views may indicate that user 110B has an interest in user 110A and may therefore be likely to match with user 110A, when presented with a recommendation of user 110A. As a further example, in certain embodiments in which recommendations 175A generated for user 110A consist of a ranked list of compatible users, recommendation engine 160 may prioritize user 110B based on the number of previous digital events user 110B has participated in. For example, recommendation engine 160 may increase the ranking of user 110B if user 110B is participating in his/her first digital event. This may be desirable to help ensure that users 110 who frequently participate in digital events have the opportunity to match with new users, rather than continually receiving recommendations of the same set of users.

Figure 4:
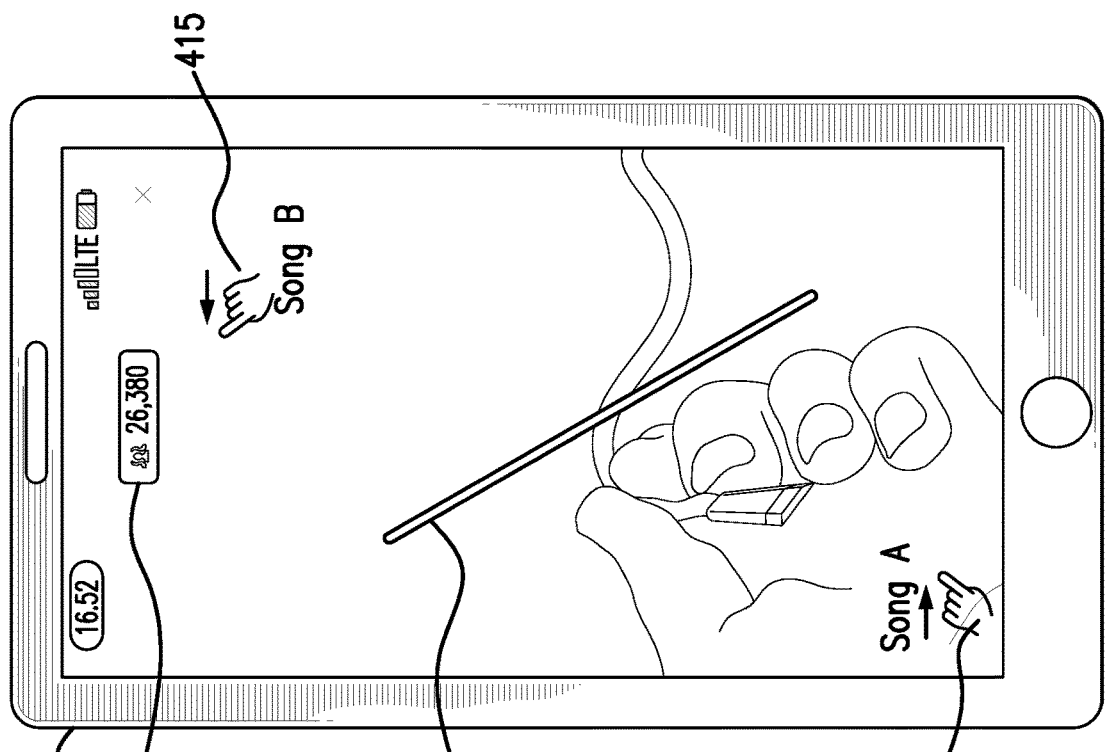
FIG. 4 presents example stills of videos transmitted by the digital experience-based recommendation tool of the system of FIG. 1.
Figure 4:
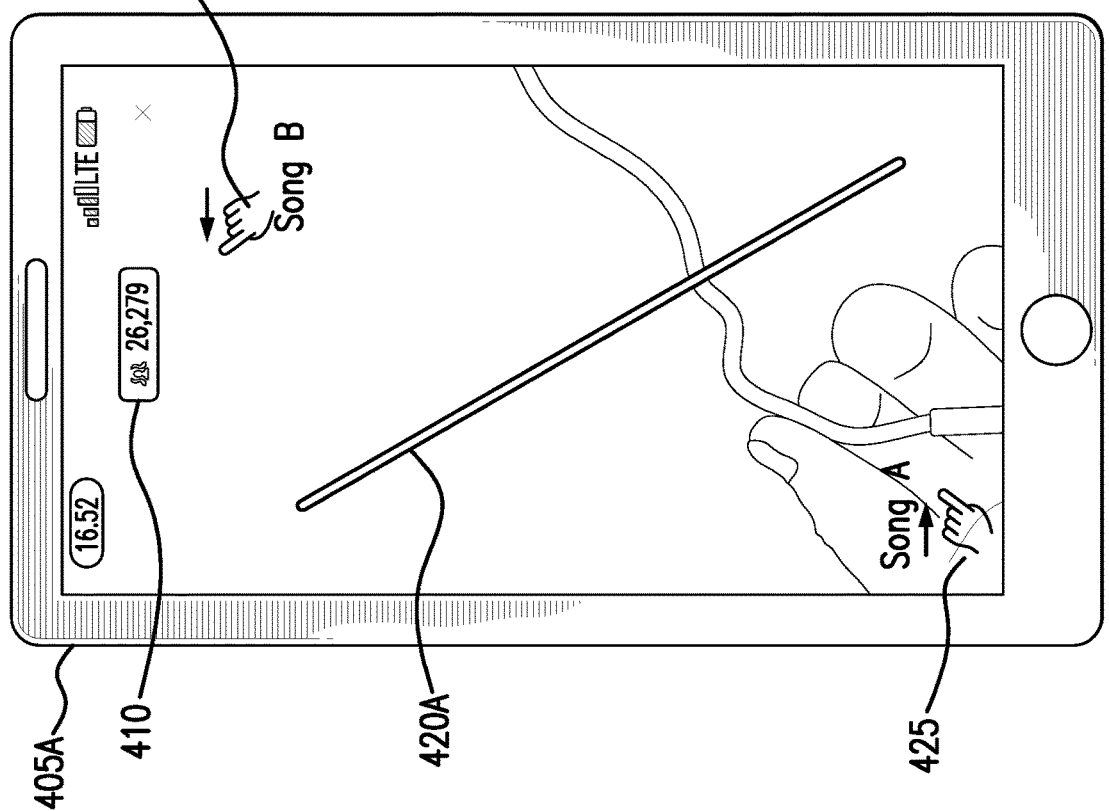

FIG. 4 presents example stills of a media file 130 transmitted by digital experience-based recommendation tool 105 to user device 115 and displayed on the screen of device 115, in certain embodiments in which user 110 has a threshold period of time during which to select response 170 from the options presented by media file 130. First still 405A corresponds to media file 130, consisting of a video displayed at time t, while second still 405B corresponds to the media file 130, consisting of a video displayed at time t+Δt, where Δt is less that the threshold period of time. While FIG. 4 illustrates media 130 in the form of videos, this disclosure contemplates that the story presented during the digital event may consist of any type of media. For example, the media may include pre-recorded videos, live-streamed video, images, text, audio, virtual or augmented reality simulations, or any other appropriate form of media.

In this example, media file 130 displays user 110 plugging his/her phone into a surround sound system, and presents user 110 with a choice between a pair of songs to play on the sound system—first choice 425, consisting of Song A, and second choice 415, consisting of Song B. As described above, in certain embodiments, media file 130 may be customizable, such that Song A and Song B are chosen from profile 135 belonging to user 110. This may be desirable to maintain the user's interest in the digital event. In certain embodiments in which digital experience-based recommendation tool 105 may not have access to any information about the musical preferences of user 110, Song A and Song B may be chosen from different musical genres, to gain insight into the user's musical tastes.

While FIG. 4 illustrates media file 130 presenting a user with a pair of options, this disclosure contemplates that media files 130 may present users 110 with a choice of any number of different options. Furthermore, these options may include options such as "skip," "no choice," or any other option that may be selected by a user to indicate that the user does not have a preference of any of the presented options.

As indicated on the screen of device 115, illustrated in FIG. 4, user 110 can either select first option 425 (Song A), by gesturing on the screen of his/her device 115 from left to right, or select second option 415 (Song B), by gesturing on the screen of his/her device 115 from right to left. If user 110 fails to choose between first option 425 and second option 415 within the threshold period of time, response analyzer 155 of digital experience-based recommendation tool 105 may select between first option 425 and second option 415, use the selected option to navigate through the non-linear branching story to a new branch of the story, and transmit media file 130 associated with this new branch to device 115. This disclosure contemplates that response analyzer 155 may select one of the options in any suitable manner. For example, in certain embodiments, response analyzer 155 may be configured to 1) randomly select one of the options from the set of possible options; 2) select a pre-determined option; 3) select the first option of the set of possible options; 4) select the most popular option of the set of possible options, as determined from responses 170 provided by other users; 5) select an option of the set of possible options based on determined or supplied personality traits of the user, e.g., an adventurous option from the set of possible options for user 110A, based on a determination from previous responses 170 supplied by user 110A that user 110A is adventurous, or an extroverted option from the set of possible options for user 110A, based on user 110A indicating that he/she is extroverted in information (other than responses 170) supplied by user 110A to generate his/her profile 135A; or 6) use any other factor to select among the available options.

In certain such embodiments, response analyzer 155 may store the selected option in memory 145 along with a weight of zero, indicating to recommendation engine 160 that this selected option should not be taken into account in matching user 110 to other users. This may be desirable, as a selected option may provide limited to no information about the user's personality traits.

In certain embodiments (and as indicated in FIG. 4), the time interval during which users 110 may select between first option 425 and second option 415 may be indicated by the length of diagonal bar 420, positioned on the screen of device 115 between first option 425 and second option 415. Here, diagonal bar 420A is longer than diagonal bar 420B, indicating that user 110 has less time in second still 405B to select between first option 425 and second option 415 than the user had in first still 405A. Encouraging user 110A to select an option within a brief interval of time may be desirable to spur the user to act on his/her instincts rather than overthinking the various options, potentially increasing the likelihood that the user's choice accurately reflects his/her personality traits.

Additionally, media files 130 may also provide an indication 410 of a number of users participating in the digital event. In certain embodiments, indication 410 may correspond to the total number of users participating in the digital event. In some embodiments, indication 410 may correspond to the number of users navigating along the same path in the non-linear branching story as user 110 and/or the number of users currently watching/receiving the same media file 130 as user 110. In certain embodiments, indication 410 may correspond to the cumulative number of users who have navigated along the same path in the non-linear branching story as user 110 and/or the number of users who have watched/received the same media file 130 as user 110 over the entire time over which users have been able to participate in the digital event. Displaying the number of users who are navigating or have navigated along the same path as user 110 and/or the number of users who are currently watching/receiving the same media file 130 or who have previously watched/received the same media file 130 as user 110 may be desirable as it may provide user 110 with an indication of the popularity of his/her choices. For example, if, after selecting first option 425, the number of other users 410 drops to one fifth its previous value, this information may indicate to user 110 that first option 425 is not a popular option among participants of the digital event.

This disclosure contemplates that media file 130, displayed in stills 405A and 405B, may contain any number of additional features. For example, in certain embodiments, users 110 may customize media files 130 that are presented to them by choosing from a number of badges and/or skins offered by digital experience-based recommendation tool 105.

Figure 5:
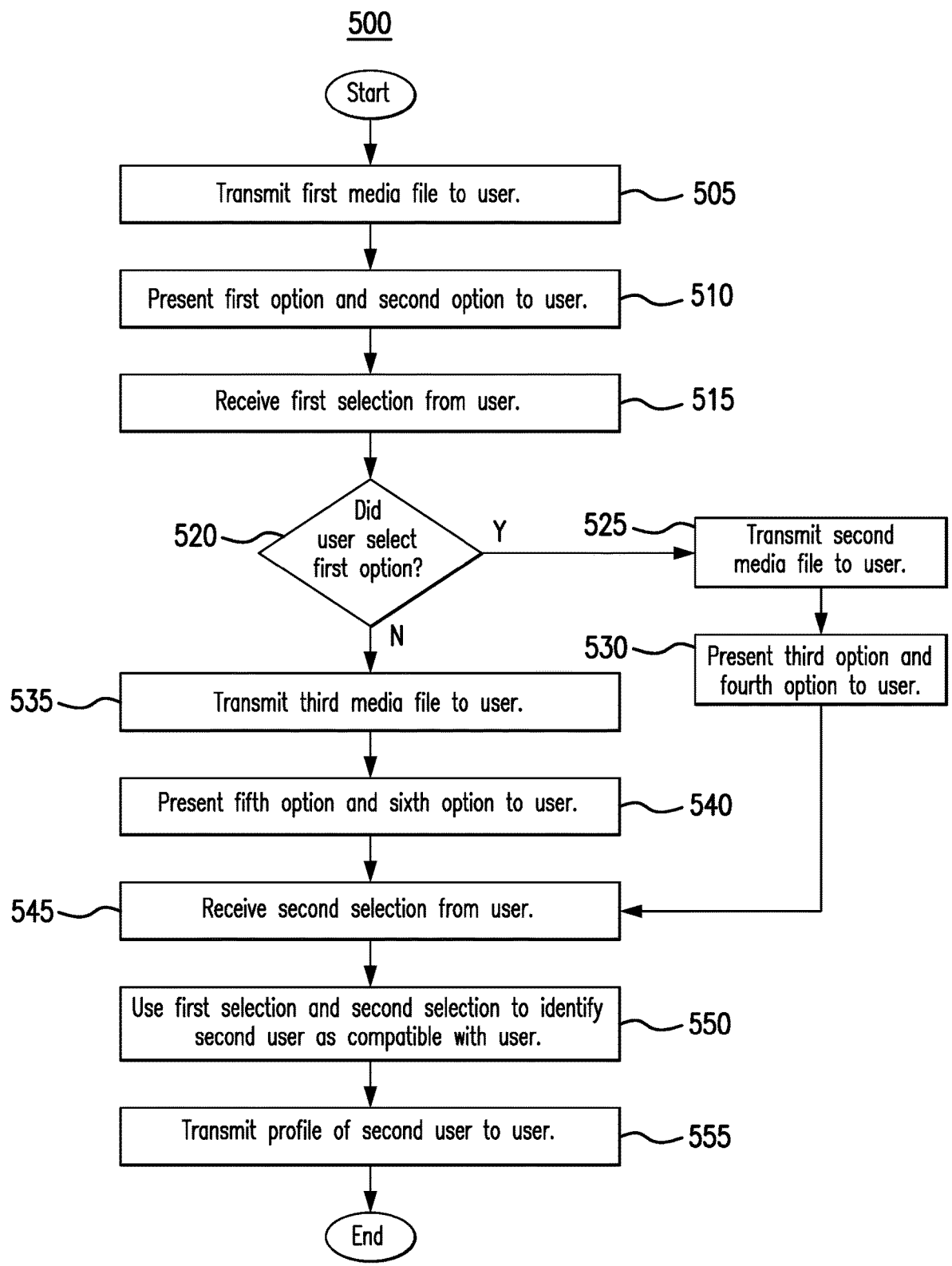
FIG. 5 presents a flowchart illustrating the process by which the digital experience-based recommendation tool of the system of FIG. 1 transmits media to users, receives responses from the users, and uses the responses to generate recommendations for the users of other users that are potentially compatible with the users.
Figure 6:
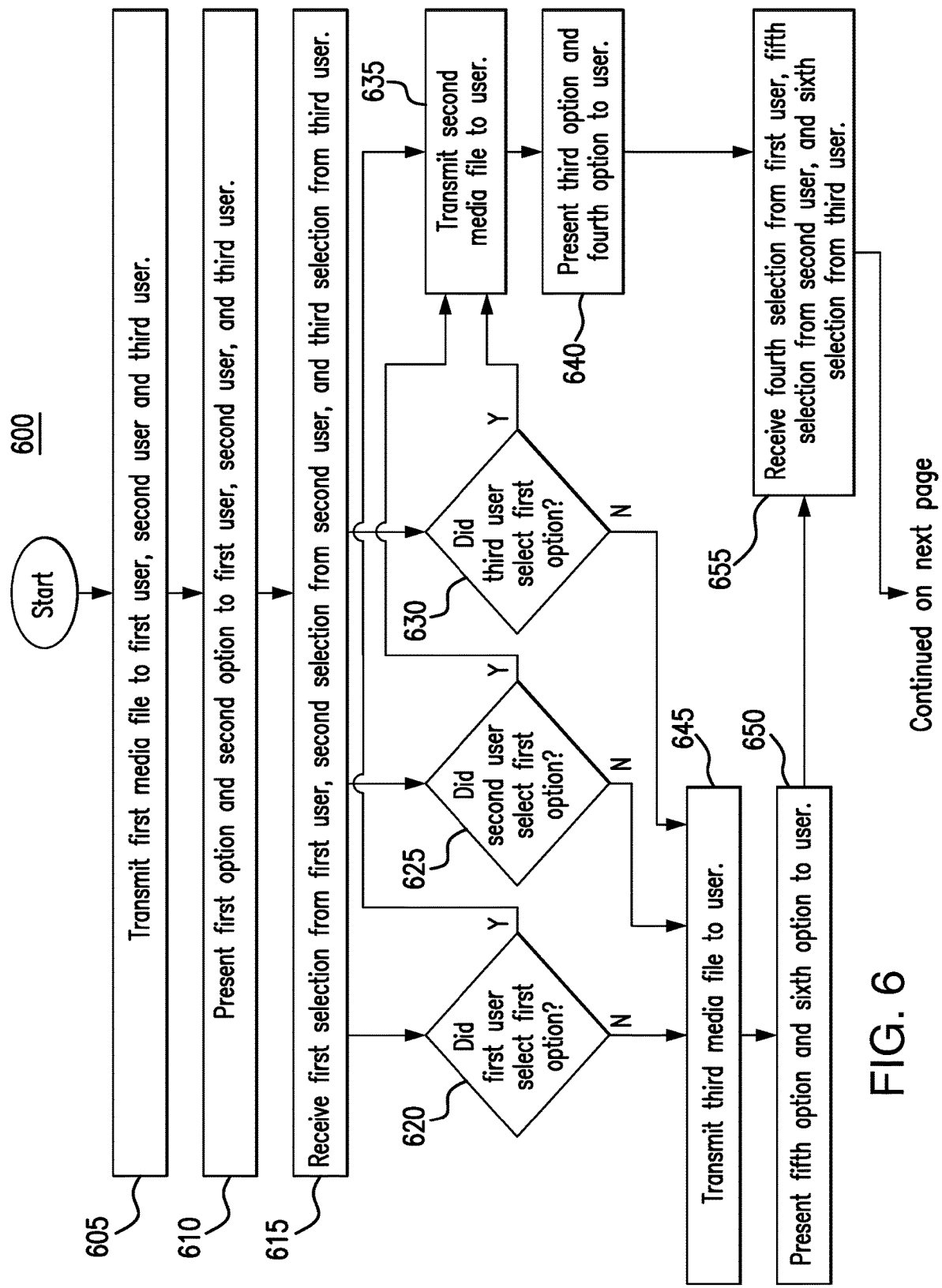
FIG. 6 presents a flowchart illustrating the branching nature of the story transmitted by the digital experience-based recommendation tool of the system of FIG. 1.
Figure 7:
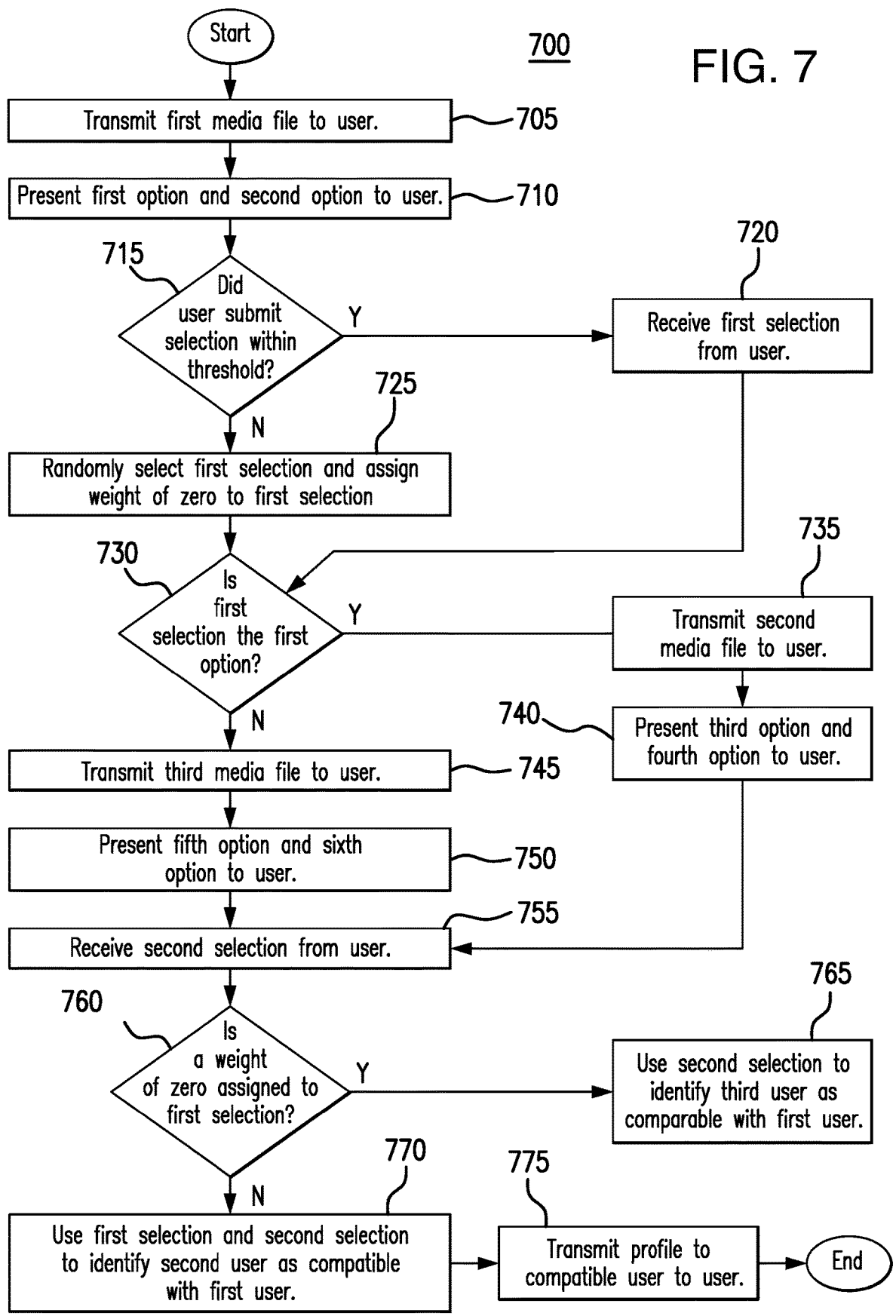
FIG. 7 presents a flowchart illustrating the behavior of the digital experience-based recommendation tool of the system of FIG. 1 in embodiments in which a user must submit responses within a threshold time period.

FIGS. 5 through 7 present flowcharts illustrating details of the operation of digital experience-based recommendation tool.

FIG. 5 presents a flowchart illustrating method 500 by which digital experience-based recommendation tool 105 transmits media files 130 to users 110, receives responses 170 from the users 110, and uses responses 170 to match users 110. FIG. 5 contemplates a digital event in which each set of options presented to user 110 throughout the event consists of a pair of options. However, this disclosure contemplates that each set of options may consist of any number of different options presented to user 110.

In step 505, digital experience-based recommendation tool 105 uses interface 150 to transmit first media file 130A to device 115A belonging to user 110A. This disclosure contemplates that each media file of the set of media 130 may present a branch of a non-linear branching story to user 110A in any suitable format. For example, in certain embodiments, media files 130A through 130N may provide user 110A with a first-person point of view video of the story. In some embodiments, media files 130A through 130N may provide user 110A with an augmented-reality experience of the story, by accessing the external facing camera of device 115A and displaying computer-generated graphics on top of the real-world surroundings of user 110A. In certain embodiments, media files 130A through 130N may also consist of audio and/or text files. In further embodiments, media files 130A through 130N may correspond to computer-generated, 3D simulations, with which user 110A may interact by using specific hardware, such as virtual reality headsets and/or sensors.

In step 510, first media file 130A presents a pair of options—a first option and a second option—to user 110A. This disclosure contemplates that media files 130A through 130N may present options to user 110A in any suitable fashion. For example, in certain embodiments, media files 130A through 130N may present options to user 110A by displaying text on the screen of the user's device 115A. In some embodiments, media files 130A through 130N may present the options to user 110A by playing audio through the speaker system of the user's device 115A.

In step 515, digital experience-based recommendation tool 105 receives a first selection from user 110A as response 170A. The first selection corresponds to the choice made by user 110A between the first option and the second option. This disclosure contemplates that user 110A may interact with each of media files 130A through 130N in any suitable manner to transmit his/her selection of a given option to digital experience-based recommendation tool 105 as response 170A. As an example, in certain embodiments, user 110A may select one of the two options by gesturing on the screen of his/her device 115A in a specified direction. For example, user 110A may select the first option by gesturing on the screen of his/her device 115A from the right side of the screen to the left side of the screen or user 110A may select the second option by gesturing on the screen of his/her device 115A from the left side of the screen to the right side of the screen. As another example, in certain embodiments, user 110A may select between the first option and the second option by entering a value using a keypad of device 115A, or a keypad displayed on the screen of device 115A. For example, user 110A may select the first option by entering "1" into the keypad or the second option by entering "2" into the keypad. As a further example, in certain embodiments, user 110A may select between the first option and the second option by tapping the screen of device 115A.

In step 520, digital experience-based recommendation tool 105 determines whether user 110A selected the first option or the second option. In this example, the first option is assigned to second media file 130B, while the second option is assigned to third media file 130C. Accordingly, if, in step 520, digital experience-based recommendation tool 105 determines that user 110A selected the first option, then in step 525, digital experience-based recommendation tool 105 uses interface 150 to transmit second media file 130B to user 110A. In step 530, second media file 130B then presents its own pair of options to user 110A.

If in step 520 digital experience-based recommendation tool 105 determines that user 110A selected the second option, then in step 535, digital experience-based recommendation tool 105 uses interface 150 to transmit third media file 130C to user 110A. In step 540, third media file 130C presents its pair of options to user 110A.

Regardless of whether user 110A selected the first option and was presented with second media file 130B or selected the second option and was presented with third media file 130C, in step 545 digital experience-based recommendation tool 105 receives a second selection from user 110A. This second selection consists of either an option chosen from the set of options presented by second media file 130B or an option chosen from the set of options presented by third media file 130C.

In step 550, digital experience-based recommendation tool 105 uses the first selection and the second selection received from user 110A to identify second user 110B as potentially compatible with user 110A. For example, in certain embodiments, digital experience-based recommendation tool 105 identifies second user 110B as potentially compatible with user 110A by directly comparing the first selection and the second selection received from user 110A to the selections received by second user 110B. In certain embodiments, digital experience-based recommendation tool 105 identifies second user 110B as potentially compatible with user 110A by first assigning weights to the first selection and the second selection received from user 110A, along with the selections receive by second user 110B, and comparing the weighted selections. This may be desirable, as certain decisions may be more probative of a user's personality traits than other decisions. For example, a decision to go sky diving rather than watch a movie may be more probative of a user's personality traits than a decision to open a left door rather than a right door.

In certain embodiments, rather than determining that user 110B is potentially compatible with user 110A by comparing the first selection and the second selection to the selections made by second user 110B, digital experience-based recommendation tool 105 may assign scores to the first selection, the second selection, and the selections made by second user 110B, and determine compatibility between user 110A and second user 110B based on the similarity of their scores. For example, the set of scores may include an extroversion score, an adventurousness score, a risk tolerance score, and a spontaneity score. In such embodiments, recommendation engine 160 may group each set of options presented by media files 130 into one or more personality categories and assign a score to each option within a given category. For example, a set of options that includes a choice between staying home or attending a party may be assigned to an extroversion category, with a score of −50 assigned to the decision to stay home and a score of +50 assigned to the decision to attend a party. This disclosure contemplates that multiple decisions made by a user while participating in a digital event may contribute to the same personality category. For example, in addition to the choice between attending a party or staying home, a decision between going backstage and meeting the lead singer of a band or staying in the general audience of a concert may also impact a user's extroversion score. Here, the decision to go backstage may be assigned a score of +20, while a decision to stay in the general audience may be assigned a score of −10. Additionally, this disclosure contemplates that decisions contributing to a given personality category need not occur in the same digital event. For example, during a first digital event, a user may choose to attend the party rather than stay home, thereby increasing the user's extroversion score. This user may also choose to go backstage and meet the lead singer of the band rather than stay in the general audience of the concert during a second digital event, thereby further increasing the user's extroversion score.

Recommendation engine 160 may determine a set of scores for user 110A by determining the scores assigned to each of the selections made by user 110A and summing the scores assigned to each personality category. Similarly, recommendation engine 160 may determine a set of scores for second user 110B by determining the scores assigned to each of the selections made by second user 110B and summing the scores assigned to each personality category. In certain embodiments, recommendation engine 160 may then determine the degree of compatibility between user 110A and second user 110B based on the similarity of their scores. In certain embodiments, rather than directly comparing the personality trait scores of user 110A and second user 110B, recommendation engine 160 may employ a machine-learning algorithm trained to generate ranked lists of compatible users 110 based on attributes that include the users' personality trait scores.

This disclosure contemplates that recommendation engine 160 may consider any number of factors, in addition to the selections received from users 110, to determine that second user 110B is compatible with user 110A. As an example, in embodiments in which recommendation engine 160 employs a machine-learning algorithm trained to generate ranked lists of compatible users 110, based on attributes that include the users' personality trait scores, the machine-learning algorithm may operate on additional attributes obtained from profile 135A, belonging to user 110A, and profile 135B, belonging to second user 110B. In such embodiments, the personality trait scores determined by tool 105 for user 110A may be placed in profile 135A and the personality trait scores determined by tool 105 for user 110B may be placed in profile 135B, such that a machine-learning algorithm configured to extract and operate on attributes obtained from profiles 135 may easily incorporate the additional attributes associated with the personality trait scores placed into profiles 135. As another example, in certain embodiments, recommendation engine 160 may consider the ages, genders, and locations of users 110 in determining that second user 110B is compatible with user 110A. For example, recommendation engine 160 may determine that second user 110B is compatible with user 110A, based in part on the fact that second user 110B falls within the age, gender, and/or location ranges specified by user 110A.

This disclosure contemplates that digital experience-based recommendation tool 105 may determine that second user 110B is likely compatible with user 110A at any point in time. For example, digital experience-based recommendation tool 105 may determine that second user 110B is likely compatible with user 110A: (1) after user 110A has finished the digital event, but before user 110B has finished the digital event; (2) after user 110A has finished the digital event and after user 110B has finished the digital event, where user 110B participated in the digital event at a later time than user 110A; (3) while user 110A is participating in the digital event and after user 110B has finished the digital event; (4) or at any other time.

After determining that second user 110B is likely compatible with user 110A, digital experience-based recommendation tool 105 transmits profile 135B assigned to second user 110B to user 110A, in step 555. In certain embodiments, rather than transmitting profile 135B, containing a profile picture of user 110B, digital experience-based recommendation tool 105 may transmit an avatar generated by user 110B to represent himself/herself. In such embodiments, user 110A may be able to see a profile picture (rather than an avatar) of user 110B only if both user 110A and user 110B choose to match with each other. The use of avatars may be desirable for users 110 wishing to maintain anonymity while participating in the digital event. The use of avatars may also be desirable to help encourage users 110 to contact potentially compatible users based on the personality traits of the potentially compatible users, rather than their personal appearances, potentially leading to more meaningful experiences in real life.

Modifications, additions, or omissions may be made to method 500 depicted in FIG. 5. Method 500 may include more, fewer, or other steps. For example, steps may be performed in parallel or in any suitable order. While discussed as digital experience-based recommendation tool 105 (or components thereof) performing the steps, any suitable component of system 100, such as device(s) 115 for example, may perform one or more steps of the method.

FIG. 6 presents a flowchart further illustrating method 600 by which digital experience-based recommendation tool 105 may match users 110, with a focus on the branching nature of the story transmitted by the tool.

In step 605, digital experience-based recommendation tool 105 uses interface 150 to transmit first media file 130A to first user 110A, second user 110B, and third user 110C. In step 610, first media file 130A presents a pair of options—a first option and a second option—to each of first user 110A, second user 110B, and third user 110C. In step 615, digital experience-based recommendation tool 105 receives selections of one of the options of the pair of options from each of first user 110A, second user 110B, and third user 110C.

This disclosure contemplates that digital experience-based recommendation tool 105 may transmit media files 130 to each of users 110A through 110C concurrently, or at different times. For example, the digital event may be scheduled from 6:00 PM to 12:00 PM, such that a user 110 may choose to begin participating in the event at any point in time between 6:00 PM and 12:00 PM. Accordingly, first user 110A may choose to begin participating in the event at 6:00 PM, such that tool 105 transmits first media file 130A to first user 110A at 6:00 PM; second user 110B may choose to begin participating in the event at 6:45 PM, such that tool 105 transmits first media file 130A to second user 110B at 6:45 PM; and third user 110C may choose to begin participating in the event at 8:00 PM, such that tool 105 transmits first media file 130A to third user 110C at 8:00 PM. Similarly, this disclosure contemplates that digital experience-based recommendation tool 105 may receive selections of one of the options from each of first user 110A, second user 110B, and third user 110C either concurrently, or at different times.

In step 620, digital experience-based recommendation tool 105 determines whether first user 110A selected the first option. Similarly, in step 625, digital experience-based recommendation tool 105 determines whether second user 110B selected the first option, and, in step 630, digital experience-based recommendation tool 105 determines whether third user 110C selected the first option. If any of first user 110A, second user 110B, and third user 110C selected the first option, then in step 635, digital experience-based recommendation tool 105 uses interface 150 to transmit second media file 130B to those users who selected the first option. In step 640, second media file 130B presents another pair of options—a third option and a fourth option—to those users who selected the first option.

If any of first user 110A, second user 110B, and third user 110C selected the second option, in step 645, digital experience-based recommendation tool 105 uses interface 150 to transmit third media file 130C to those users who selected the second option. In step 650, third media file 130C presents its own pair of options—a fifth option and a sixth option—to those users who selected the second option.

Regardless of which of users 110A, 110B, and 110C selected the first option or the second option, in step 655, digital experience-based recommendation tool 105 receives a fourth selection from first user 110A, a fifth selection from user 110B, and a sixth selection from user 110C. Again, this disclosure contemplates that the fourth, fifth, and sixth selections may be received concurrently, or at different times. The fourth, fifth, and sixth selections each consist of either an option chosen from the set of options presented by second media file 130B or an option chosen from the set of options presented by third media file 130C.

In step 660, digital experience-based recommendation tool 105 determines a first score, based on the selections made by first user 110A and second user 110B—namely, the first selection, the fourth selection, the second selection, and the fifth selection—between first user 110A and second user 110B. Similarly, in step 665, digital experience-based recommendation tool 105 determines a second score, based on the selections made by first user 110A and third user 110B—namely, the first selection, the fourth selection, the third selection, and the sixth selection—between first user 110A and third user 110C. In step 670, digital experience-based recommendation tool 105 compares the first score and the second score. If, in step 670, digital experience-based recommendation tool 105 determines that the first score is greater than the second score, this indicates that second user 110B is likely more compatible with first user 110A. Accordingly, in step 675, digital experience-based recommendation tool 105 transmits profile 135B belonging to second user 110B to first user 110A. On the other hand, if, in step 670, digital experience-based recommendation tool 105 determines that the second score is greater than the first score, indicating that third user 110C is more compatible with first user 110A, then in step 680, digital experience-based recommendation tool 105 transmits profile 135C belonging to third user 110C to first user 110A.

This disclosure contemplates that digital experience-based recommendation tool 105 may determine that second user 110B or third user 110C is likely compatible with user 110A at any point in time. For example, digital experience-based recommendation tool 105 may determine that second user 110B or third user 110C is likely compatible with user 110A: (1) after user 110A has finished the digital event, but before users 110B and 110C have finished the digital event; (2) after user 110A has finished the digital event and after users 110B and 110C have finished the digital event, where one or both of users 110B and 110C participated in the digital event at a later time than user 110A; (3) while user 110A is participating in the digital event and after users 110B and 110C have finished the digital event; (4) or at any other time.

Modifications, additions, or omissions may be made to method 600 depicted in FIG. 6. Method 600 may include more, fewer, or other steps. For example, steps may be performed in parallel or in any suitable order. While discussed as digital experience-based recommendation tool 105 (or components thereof) performing the steps, any suitable component of system 100, such as device(s) 115 for example, may perform one or more steps of the method.

FIG. 7 presents a flowchart illustrating the behavior of digital experience-based recommendation tool 105 in embodiments in which user 110 may only submit response 170 to digital experience-based recommendation tool 105 within a threshold time period.

In step 705, digital experience-based recommendation tool 105 transmits first media file 130A to user 110A. In step 710, first media file 130A presents a first option and a second option to user 110A. In step 715, digital experience-based recommendation tool 105 determines whether user 110A submitted a selection of the first option or the second option within the threshold time period. If digital experience-based recommendation tool 105 determines that user 110A did submit a selection within the threshold time period, then, in step 720, the tool receives this selection as a first selection from user 110A. If digital experience-based recommendation tool 105 determines that user 110A did not submit a selection within the threshold time period, then, in step 725, the tool selects a first selection for user 110A from the first option and the second option and assigns a weight of zero to this first selection, indicating that this selected option should not be taken into account in matching user 110A to other users. This disclosure contemplates that response analyzer 155 may select one of the options in any suitable manner. For example, in certain embodiments, response analyzer 155 may be configured to 1) randomly select one of the options from the set of possible options; 2) select a pre-determined option; 3) select the first option of the set of possible options; 4) select the most popular option of the set of possible options, as determined from responses 170 provided by other users; 4) select an option of the set of possible options based on determined or supplied personality traits of the user, e.g., an adventurous option from the set of possible options for user 110A, based on a determination from previous responses 170 supplied by user 110A that user 110A is adventurous, or an extroverted option from the set of possible options for user 110A, based on user 110A indicating that he/she is extroverted in information (other than responses 170) supplied by user 110A to generate his/her profile 135A; or 6) use any other factor to select among the available options. Selecting an option for the user if user 110A does not submit a selection within the threshold time period may be desirable as it may encourage user 110A to act on his/her instincts rather than overthinking the various options, potentially increasing the likelihood that the user's choice accurately reflects his/her personality traits.

In step 730, digital experience-based recommendation tool 105 determines whether the first selection is the first option. If digital experience-based recommendation tool 105 determines that the first selection is the first option, then, in step 735, the tool transmits second media file 130B to user 110A. Second media file 130B then presents another pair of options—a third option and a fourth option—to user 110A, in step 740. On the other hand, if, in step 730, digital experience-based recommendation tool 105 determines that the first selection is not the first option, then in step 745, the tool transmits third media file 130C to user 110A. Third media file 130C then presents its own set of options—a fifth option and a sixth option—to user 110, in step 750.

Regardless of whether the first selection was determined to be the first option or the second option in step 730, in step 755 digital experience-based recommendation tool 105 receives a second selection from user 110A. In step 760, digital experience-based recommendation tool 105 determines whether a weight of zero is assigned to the first selection. If a weight of zero is assigned to the first selection, then, in step 765, digital experience-based recommendation tool 105 uses the second selection to identify third user 110C as likely compatible with first user 110A (i.e., digital experience-based recommendation tool 105 does not consider the selection in determining the degree of compatibility of other users with user 110A). Ignoring any options selected by tool 105 rather than by user 110A in the compatibility determination may be desirable, as a selected option may provide limited to no information about the user's personality traits.

On the other hand, if a weight of zero is not assigned to the first selection, then, in step 770, digital experience-based recommendation tool 105 uses the first selection and the second selection to identify second user 110B as likely compatible with first user 110A. Finally, in step 775, digital experience-based recommendation tool 105 transmits profile 135 of the compatible user (either second user 110B or third user 110C) to user 110A. This disclosure contemplates that digital experience-based recommendation tool 105 may transmit profile 135 to user 110A at any time during and/or after the digital event.

Modifications, additions, or omissions may be made to method 700 depicted in FIG. 7. Method 700 may include more, fewer, or other steps. For example, steps may be performed in parallel or in any suitable order. While discussed as digital experience-based recommendation tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A method executed by at least one hardware processor comprising the steps of:
    storing, by a storage element:
        a set of profiles comprising a profile of a first user and a profile of a second user; and
        a set of weights comprising a first weight and a second weight, the first weight assigned to a first choice, the second weight assigned to a second choice;
    transmitting, by a communication element, a first media file to a device of the first user, the first media file configured to present the first choice between at least two options;
    receiving, by the communication element, from the first user a first selection in response to the first choice;
    in response to receiving the first selection from the first user:
        transmitting, by the communication element, a second media file to the device of the first user, the second media file being associated with the first selection and configured to present the second choice between at least two options;
        receiving, by the communication element, from the first user a second selection in response to the second choice;
        identifying, by a processing element, based in part on the first selection, the second selection, the first weight, the second weight, the profile of the first user, and the profile of the second user, the second user as potentially compatible with the first user; and
        transmitting, by the communication element, to the first user the profile of the second user.

2. The method of claim 1, further comprising:
    transmitting the first media file to a device of a third user;
    receiving from the third user a third selection in response to the first choice, the third selection different from the first selection; and
    in response to receiving the third selection from the third user:
        transmitting a third media file to the device of the third user, the third media file configured to present a third choice between at least two options;
        receiving from the third user a fourth selection in response to the third choice;
        identifying, based in part on the third selection and the fourth selection, a fourth user as potentially compatible with the third user; and
        transmitting to the third user a profile of the fourth user.

3. The method of claim 2, further comprising:
    in response to receiving the second selection from the first user, transmitting a fourth media file to the device of the first user;
    in response to receiving the fourth selection from the third user, the fourth selection different from the second selection, transmitting the fourth media file to the device of the third user.

4. The method of claim 2, further comprising:
    transmitting the first media file to a device of the second user;
    receiving from the second user a fifth selection in response to the first choice, the fifth selection the same as the first selection; and
    in response to receiving the fifth selection from the second user:
        transmitting the second media file to the device of the second user; and
        receiving from the second user a sixth selection in response to the second choice, the sixth selection different from the second selection; wherein, identifying the second user as potentially compatible with the first user comprises:
            determining a first score, based in part on the first selection, the second selection, the fifth selection, and the sixth selection, between the first user and the second user;
            determining a second score, based in part on the first selection, the second selection, the third selection, and the fourth selection, between the first user and the third user; and
            determining that the first score is greater than the second score.

5. The method of claim 1, wherein the first selection must be received from the first user within a certain period of time.

6. The method of claim 1, further comprising in response to receiving the first selection and the second selection, adding information to the profile of the first user, the information based in part on the first selection and the second selection.

7. An apparatus comprising:
    a memory configured to store:
        a set of profiles comprising a profile of a first user and a profile of a second user; and
        a set of weights comprising a first weight and a second weight, the first weight assigned to a first choice, the second weight assigned to a second choice;
    an interface configured to send and receive data over a network; and a hardware processor configured to:
transmit, using the interface, a first media file to a device of the first user, the first media file configured to present the first choice between at least two options;
receive from the first user, using the interface, a first selection in response to the first choice;
in response to receiving the first selection from the first user:
  transmit, using the interface, a second media file to the device of the first user, the second media file being associated with the first selection and configured to present the second choice between at least two options;
  receive from the first user, using the interface, a second selection in response to the second choice;
  identify, based in part on the first selection, the second selection, the first weight, the second weight, the profile of the first user, and the profile of the second user, the second user as potentially compatible with the first user; and
  transmit to the first user, using the interface, the profile of the second user.

8. The apparatus of claim 7 wherein the processor is further configured to:
transmit, using the interface, the first media file to a device of a third user;
receive from the third user, using the interface, a third selection in response to the first choice, the third selection different from the first selection; and
in response to receiving the third selection from the third user:
  transmit, using the interface, a third media file to the device of the third user, the third media file configured to present a third choice between at least two options;
  receive from the third user, using the interface, a fourth selection in response to the third choice;
  identify, based in part on the third selection and the fourth selection, a fourth user as potentially compatible with the third user; and
  transmit to the third user, using the interface, a profile of the fourth user.

9. The apparatus of claim 8, wherein the processor is further configured to:
in response to receiving the second selection from the first user, transmit, using the interface, a fourth media file to the device of the first user;
in response to receiving the fourth selection from the third user, the fourth selection different from the second selection, transmit, using the interface, the fourth media file to the device of the third user.

10. The apparatus of claim 8, wherein:
the processor is further configured to:
transmit, using the interface, the first media file to a device of the second user;
receive from the second user, using the interface, a fifth selection in response to the first choice, the fifth selection the same as the first selection; and
in response to receiving the fifth selection from the second user:
  transmit, using the interface, the second media file to the device of the second user; and
  receive from the second user, using the interface, a sixth selection in response to the second choice, the sixth selection different from the second selection; and
identifying the second user as potentially compatible with the first user comprises:
  determining a first score, based in part on the first selection, the second selection, the fifth selection, and the sixth selection, between the first user and the second user;
  determining a second score, based in part on the first selection, the second selection, the third selection, and the fourth selection, between the first user and the third user; and
  determining that the first score is greater than the second score.

11. The apparatus of claim 7, wherein the first selection must be received from the first user within a certain period of time.

12. The apparatus of claim 7, wherein in response to receiving the first selection and the second selection, the processor is further configured to add information to the profile of the first user, the information based in part on the first selection and the second selection.

13. A system comprising:
a communication element operable to send and receive data over a network;
a storage element operable to store:
  a set of media files comprising a first media file and a second media file, the first media file configured to present a first choice between at least two options, the second media file configured to present a second choice between at least two options;
  a set of profiles comprising a profile of a first user and a profile of a second user; and
  a set of weights comprising a first weight and a second weight, the first weight assigned to the first choice, the second weight assigned to the second choice; and
a processor operable to:
  transmit, using the communication element, the first media file to a device of the first user;
  receive from the first user, within a threshold period of time, using the communication element, a first selection in response to the first choice;
  in response to receiving the first selection from the first user:
    transmit, using the communication element, the second media file to the device of the first user, the second media file being associated with the first selection and configured to present the second choice between at least two options;
    receive from the first user, within the threshold period of time, using the communication element, a second selection in response to the second choice;
    identify, based in part on the first selection, the second selection, the first weight, the second weight, the profile of the first user, and the profile of the second user, the second user as potentially compatible with the first user;
    transmit to the first user, using the communication element, the profile of the second user; and
    add information to the profile of the first user, the information based in part on the first selection and the second selection.

14. The system of claim 13 wherein:
the set of media files further comprises a third media file configured to present a third choice between at least two options; the set of profiles further comprises a profile of a third user and a profile of a fourth user; and
the processor is further operable to:
  transmit, using the communication element, the first media file to a device of a third user;

receive from the third user, using the communication element, a third selection in response to the first choice, the third selection different from the first selection; and in response to receiving the third selection from the third user:

transmit, using the communication element, the third media file to the device of the third user;

receive from the third user, using the communication element, a fourth selection in response to the third choice;

identify, based in part on the third selection, the fourth selection, the profile of the third user, and the profile of the fourth user, the fourth user as potentially compatible with the third user; and transmit to the third user, using the communication element, the profile of the fourth user.

15. The system of claim 14, wherein:

the set of media files further comprises a fourth media file; and the processor is further operable to:

in response to receiving the second selection from the first user, transmit, using the communication element, the fourth media file to the device of the first user; and in response to receiving the fourth selection from the third user, the fourth selection different from the second selection, transmit, using the interface, the fourth media file to the device of the third user.

16. The system of claim 14, wherein:

the processor is further operable to:

transmit, using the communication element, the first media file to a device of the second user;

receive from the second user, using the communication element, a fifth selection in response to the first choice, the fifth selection the same as the first selection; and in response to receiving the fifth selection from the second user:

transmit, using the communication element, the second media file to the device of the second user; and receive from the second user, using the communication element, a sixth selection in response to the second choice, the sixth selection different from the second selection; and identifying the second user as potentially compatible with the first user comprises:

determining a first score between the first user and the second user, based in part on the first selection, the second selection, the fifth selection, the sixth selection, the first profile, and the second profile;

determining a second score between the first user and the third user, based in part on the first selection, the second selection, the third selection, the fourth selection, the first profile and the third profile; and determining that the first score is greater than the second score.

* * * * *